US012744987B2

(12) United States Patent
Cok et al.

(10) Patent No.: US 12,744,987 B2
(45) Date of Patent: Sep. 22, 2026

(54) OPTICAL COMMUNICATION SYSTEMS WITH DISPLAYS

(71) Applicant: Daktronics, Inc., Brookings, SD (US)

(72) Inventors: Ronald S. Cok, Rochester, NY (US); Nikhil Jain, Raleigh, NC (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 18/751,538

(22) Filed: Jun. 24, 2024

(65) Prior Publication Data

US 2025/0080823 A1 Mar. 6, 2025

Related U.S. Application Data

(60) Provisional application No. 63/579,809, filed on Aug. 30, 2023.

(51) Int. Cl.

| | |
|---|---|
| ***H04N 23/56*** | (2023.01) |
| ***G06T 7/00*** | (2017.01) |
| ***G09G 3/32*** | (2016.01) |
| ***H04N 23/66*** | (2023.01) |

(52) U.S. Cl.

CPC ........... *H04N 23/56* (2023.01); *G06T 7/0002* (2013.01); *G09G 3/32* (2013.01); *H04N 23/66* (2023.01); *G06T 2207/30168* (2013.01); *G09G 2310/04* (2013.01); *G09G 2370/18* (2013.01)

(58) Field of Classification Search

CPC .... G06F 18/00; G06F 3/0317; G06F 3/03545; G06K 7/10; G06V 30/1423; G06V 40/30; H04N 21/47; H04N 21/482

USPC .......................................................... 348/125

See application file for complete search history.

(56) References Cited

U.S. PATENT DOCUMENTS

| | | | | |
|---|---|---|---|---|
| 6,798,396 | B2 | 9/2004 | Gemunder et al. | |
| 7,411,609 | B2 | 8/2008 | Brumitt et al. | |
| 9,832,441 | B2 | 11/2017 | Osman | |
| 11,568,796 | B1 | 1/2023 | Ozbas et al. | |
| 12,236,825 | B2 | 2/2025 | Cok et al. | |
| 12,300,150 | B2 | 5/2025 | Jain et al. | |
| 2004/0233293 | A1 * | 11/2004 | Brumitt | H04N 23/90 348/207.1 |
| 2006/0038833 | A1 | 2/2006 | Mallinson et al. | |
| 2010/0053164 | A1 | 3/2010 | Imai et al. | |
| 2012/0013770 | A1 | 1/2012 | Stafford et al. | |
| 2012/0086630 | A1 | 4/2012 | Zhu et al. | |
| 2012/0287287 | A1 | 11/2012 | Grossmann et al. | |

(Continued)

*Primary Examiner* — Masum Billah

(74) *Attorney, Agent, or Firm* — Schwegman Lundberg & Woessner, P.A.

(57) ABSTRACT

An optical communication system includes a display having display pixels operable to display an image and a digital camera disposed and operable to capture and record the displayed image. A digital camera frame rate can be greater than a display frame rate. Multiple digital cameras can be disposed and operable to capture and record the displayed image. A mirror can be disposed to reflect the image from the display to a digital camera. One or more intermediate digital cameras and displays can be disposed to capture and re-display the image for the digital camera. Images can include encoded addresses for the digital cameras. Synchronization display pixels can indicate new displayed images to trigger a digital camera to record the new displayed image. A camera light emitter can indicate that a digital camera has recorded a displayed image.

20 Claims, 23 Drawing Sheets

(56) References Cited

U.S. PATENT DOCUMENTS

| | | | | |
|---|---|---|---|---|
| 2018/0090096 | A1* | 3/2018 | Post | G09G 3/3651 |
| 2020/0175916 | A1 | 6/2020 | Zou et al. | |
| 2020/0286410 | A1 | 9/2020 | Wu | |
| 2021/0111302 | A1 | 4/2021 | Pan | |
| 2021/0335187 | A1 | 10/2021 | Hong et al. | |
| 2022/0208142 | A1 | 6/2022 | Yang et al. | |
| 2023/0196979 | A1 | 6/2023 | Cok | |
| 2025/0166554 | A1 | 5/2025 | Cok | |
| 2025/0310638 | A1 | 10/2025 | Meitl et al. | |

* cited by examiner

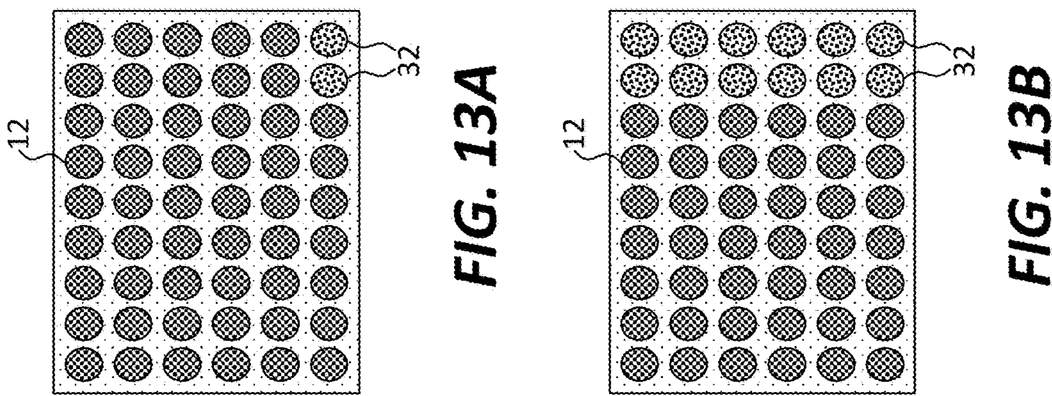
FIG. 13A
FIG. 13B
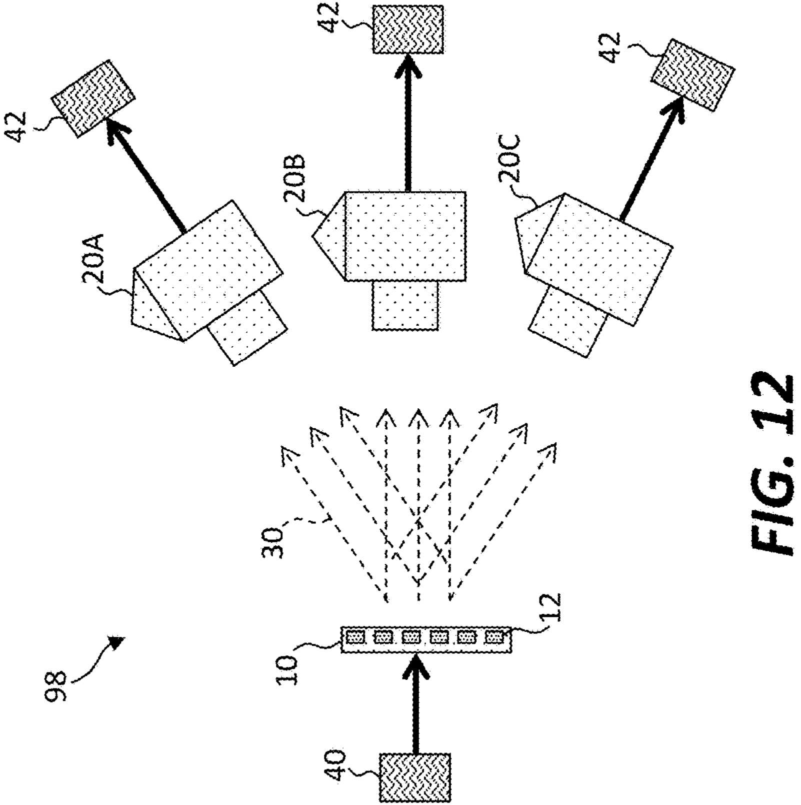
FIG. 12

95
10
12
30
20
22

OPTICAL COMMUNICATION SYSTEMS WITH DISPLAYS

PRIORITY APPLICATION

This application claims the benefit of U.S. Provisional Application No. 63/579,809, filed Aug. 30, 2023, the disclosure of which is hereby incorporated by reference herein in its entirety.

TECHNICAL FIELD

The present disclosure relates generally to devices and methods for optical communication using a display.

BACKGROUND

Optical systems are widely used to communicate between remote locations. Typical optical communication systems transmit optical signals from a laser to a photosensor over fiber optic cables. Some cables transmit a single signal through a single-mode fiber, other cables transmit multiple signals through a multi-mode fiber. Free-space optical systems transmit optical signals through free space (e.g., the atmosphere or outer space) with modulated laser light detected by a photosensor positioned within the laser beam.

In other configurations, optical communication systems can incorporate a display and a camera. For example, U.S. Pat. Nos. 6,798,396 and 7,411,609, both entitled System and Method for Optically Communicating Information between a Display and a Camera, disclose a camera observing a display to optically communicate information by displaying a series of symbols and images on the display.

There is an increasing need for communication bandwidth and computation to support such applications as artificial intelligence, internet search fulfilment, and internet services requiring internet-accessible computers. To support this need, a large number of computers must compute and communicate and are often co-located in data centers. Conventionally, the computers in a data center communicate electronically, for example through wired ethernet connections. More recently, fiber optic cables can connect computers within a single data center. However, the physical size of the cables and their length is becoming a limitation on the computational capacity of connected computers within a data center.

There is a need, therefore, for improvements in devices and methods for optical communication.

SUMMARY

The present disclosure provides, inter alia, architectures, structures, devices, and methods for improved optical communication using arrays of pixels in a display.

According to embodiments of the present disclosure, an optical communication system can comprise a display comprising display pixels operable to display an image on the display with the display pixels, a display sync pixel operable to signal when the image on the display is displayed, and a digital camera disposed and operable to record the image in response to the display sync pixel signal when the image is displayed. The digital camera can be operable to detect the display sync pixel and to record the image when the display sync pixel turns on or when the display sync pixel turns off or is operable to record the image when the display sync pixel turns on and when the display sync pixel turns off. In some embodiments, the display sync pixel is a display pixel. In some embodiments, the display sync pixel can be separate from or adjacent to the display and is not a display pixel. In some embodiments, the display sync pixel can be separately controllable from the display pixels. In some embodiments, the display can be operable to turn on the display sync pixel substantially at the same time as or after the image is displayed.

According to embodiments of the present disclosure, the display pixels can be disposed in a two-dimensional array and the display sync pixel can be one of the display pixels in the two-dimensional array. In some embodiments, the display pixels can be disposed in a regular array and the display sync pixel can be spatially disposed separately from the regular array. In some embodiments, the display pixels can be disposed in a one-dimensional array and the display sync pixel can be one of the display pixels in the one-dimensional array. In some embodiments, the display pixels can be disposed in a two-dimensional array comprising multiple one-dimensional arrays and each of the one-dimensional arrays of display pixels can comprise a display sync pixel.

According to embodiments of the present disclosure, the camera can comprise camera pixels disposed in an array operable to record the image and a camera sync detector operable to detect the display sync pixel. The camera sync detector can comprise one or more camera pixels. The camera sync detector can be separate from the camera. Some embodiments comprise a camera sync light emitter operable to signal when the image is recorded by the camera. Some embodiments comprise a display sync detector operable to detect the camera sync light emitter.

In some embodiments, the display sync pixel is a display pixel and the image comprises display sync data. In some embodiments, the camera continuously captures images of the display and analyzes the captured images to detect a display sync pixel (e.g., monitors the display status) and, when a display sync pixel changes state, records the corresponding captured image or an image immediately following the captured image. When a display sync pixel is part of a displayed image, it can be the last pixel, or one of a group of pixels that are the last pixels (e.g., the last row) updated when an image is updated and displayed on the display (e.g., when the display is controlled using matrix addressing).

According to embodiments of the present disclosure, an optical communication system can comprise a display system comprising a display comprising display pixels, a display sync pixel, and a display circuit operable to control the display, receive an image, display the image on the display with the display pixels, and operate the display sync pixel to signal when the image is displayed. An optical communication system can comprise a camera system comprising a camera disposed and operable to record the image in response to the display sync pixel signaling when the image is displayed, and a camera circuit operable to control the camera and store or process the image and, optionally, to control a camera sync light emitter responsive to recording the image.

A method of operating the optical communication system according to the present disclosure can comprise displaying an image on the display, operating the display sync pixel to signal that the image is displayed, and responding to the sync pixel signal by recording the image with the camera. The optical communication system can comprise a camera sync pixel operable to signal when the image is recorded by the camera, and methods of the present disclosure can comprise operating the camera sync pixel to signal that the image is recorded by the camera. Some embodiments comprise operating the display sync pixel in response to the camera sync pixel signal to signal that the camera sync signal was operated.

In some embodiments the image displayed on the display is a first image and methods of the present disclosure can comprise displaying a second image different from the first image with the display pixels and operating the display sync pixel. Some embodiments can comprise alternating turning the display sync pixel on and off to signal that sequential images are displayed. Some embodiments can comprise alternating turning the camera sync pixel on and off to signal that sequential images are recorded.

According to embodiments of the present disclosure, an optical communication system can comprise a display comprising display pixels operable to display an image on the display with the display pixels at a display frame rate and a digital camera disposed and operable to capture and record the image at a camera frame rate. The camera frame rate can be equal to or greater than the display frame rate.

According to embodiments of the present disclosure, an optical communication system can comprise a display comprising display pixels operable to display an image on the display with the display pixels and digital cameras disposed and operable to capture and record the image on the display. Each of the digital cameras can comprise a camera identifier and the image can comprise one or more encoded addresses, e.g., referring to a camera identifier. In some embodiments, the display can comprise rows and columns of pixels and the image can comprise one or more encoded addresses in each row. In some embodiments, two or more rows of the image comprise a same encoded address in each row. In some embodiments, the display comprises rows and columns of pixels. In some embodiments, each of the digital cameras corresponds to one or more subsets (e.g., rows or a two-dimensional subset) of pixels. In some embodiments, each of the digital cameras comprises a camera identifier and each of the camera identifiers corresponds to one or more of the subsets of pixels.

According to embodiments of the present disclosure, a method of operating an optical communication system can comprise displaying an image with the display pixels and recording at least a portion of the image with one or more of the digital cameras. Each of the digital cameras can comprise a camera identifier and methods of the present disclosure can comprise providing the image having one or more encoded addresses and identifying the one or more encoded addresses in the image with each digital camera. If the encoded address in the image matches the camera identifier of the digital camera, methods can comprise performing an action with the digital camera (e.g., the matched digital camera). Thus, in some embodiments, multiple, but not all, digital cameras can respond to a displayed image with a corresponding multiple of encoded addresses, e.g., by recording the image and performing a related action. If the encoded address in the image does not match the camera identifier of the digital camera, methods can comprise not performing the action. In some embodiments, a plurality of addresses is encoded in the image, each encoded address is associated with a portion of the image, and methods of the present disclosure can comprise recording the portion associated with the encoded address with the digital camera having a camera identifier matching the encoded address. Each of the digital cameras can record a portion of the image corresponding to a camera identifier associated with the digital camera.

According to embodiments of the present disclosure, an optical communication system can comprise a display comprising display pixels operable to display an image on the display with the display pixels and a digital camera disposed and operable to record the image on the display. In embodiments, the display and the digital camera are not in a direct line-of-sight. Some embodiments can comprise a mirror that reflects the image on the display and the digital camera can be disposed and operable to record the reflection of the image on the display. In some embodiments, the display is a first display, the display pixels are first display pixels operable to display a first image on the display with the first display pixels, and the digital camera is a second digital camera disposed and operable to capture and record a second image. Some methods can comprise a first digital camera disposed and operable to capture the first image on the first display and a second display, the second display operable to display at least a portion of a version of the captured first image as a second image with the second display pixels. In embodiments, (i) the first display and the first digital camera can be within a first line of sight, the second display and the second digital camera can be within a second line of sight, and the first line of sight and the second line of sight can be different, (ii) the second digital camera cannot directly image (e.g., observe or view) the first display, (iii) the first display can be not visible from the second digital camera, or (iii) any one or combination of (i), (ii), and (iii).

Some embodiments comprise an image processor connected and operable to receive the captured image from the first digital camera, to process the received captured image, and to provide the processed image to the second display. Some embodiments comprise a plurality of second displays comprising second display pixels, each of the second displays operable to display at least a portion of a version of the captured image as a second image with the second display pixels, and a plurality of second digital cameras disposed and operable to record the second image on the second display.

According to embodiments of the present disclosure, an optical communication system can comprise a digital camera operable to capture an image displayed on a first display and second displays. Each of the second displays can comprise display pixels operable to display the image on the second display with the display pixels. The digital camera and the second displays can be under common control or the second displays can be controlled by the digital camera.

In some embodiments, an optical communication system can comprise a digital camera operable to capture an image displayed on a first display and a second display. The second display can comprise display pixels operable to display the image on the second display with the display pixels. The digital camera and the second display can be under common control or the second display can be controlled by the digital camera.

According to embodiments of the present disclosure, a method of testing an optical communication system can comprise providing a display and a digital camera, the digital camera operable to capture images shown on the display, and either (i) capturing a sequence of images shown on the display, determining an average luminance of the display or of display pixels in the display, comparing the average luminance of the display or the display pixels to a predetermined luminance, and, if the average and predetermined luminance are different by a pre-determined amount, replacing the display; or (ii) displaying a test pattern on the display, measuring a performance of the display or display pixels, and if the measured performance is different from a pre-determined performance by a pre-determined amount, replacing the display.

According to some embodiments of the present disclosure, a variable-resolution optical communication system can comprise a display operable to display an image with a display number of display pixels and a digital camera disposed and operable to capture a camera image with a camera number of camera pixels and to record the image with a recorded number of recorded pixels. In some embodiments, (i) the recorded number is smaller than the display number, (ii) the camera number is smaller than the display number, (iii) the number of effectively distinguished pixels in the captured image is less than the display number; (iv) the display pixels are binary pixels and the camera pixels are non-binary pixels, or (v) any combination of (i), (ii), (iii), and (iv). The display number can be an integer multiple of the camera number. The display number can be a power of two greater than the camera number, wherein the power of two is greater than zero, or can be a square integer multiple of the camera number. In some embodiments, the multiple is two, three, four, five, six, seven, or eight or is two, four, eight, sixteen, thirty-two, or sixty-four, or is four, nine, sixteen, twenty-five, thirty-six, forty-nine, or sixty-four. A display having a larger pixel resolution or display number can support digital cameras that have a comparable camera number to the display number and digital cameras that have a smaller camera number than the display number, providing operational and implementation flexibility in a variable-resolution optical system with a variety of digital cameras.

In some embodiments, the display pixels can be disposed in a two-dimensional array and the camera pixels can be disposed in a one-dimensional array. In some embodiments, the display pixels are disposed in a two-dimensional array and the camera pixels are disposed in a two-dimensional array.

According to some embodiments of the present disclosure, each camera pixel is operable to record the total luminance of multiple adjacent display pixels. In some embodiments, multiple adjacent display pixels imaged onto a camera pixel are a square number of display pixels, e.g., equal to $x^2$ for some value of x. In some embodiments, the square number is four, nine, sixteen, twenty-five, thirty-six, forty-nine, or sixty four (e.g., x is two, three, four, five, six, seven, or eight). In some embodiments, the camera pixels capture a number of different values substantially equal to a ratio between the display number and the camera number plus one.

According to some embodiments of the present disclosure, a digital camera can comprise a camera substrate comprising a plurality of camera pixels, an optical system operable to image a scene onto the camera pixels, and a camera disposed and operable to capture the scene with the camera pixels, and wherein the camera pixels provide a number of different values that is a power of two. In some embodiments, the number of different values is two, e.g., a binary value such as zero or one. Such a digital camera can be a binary camera that records only black-and-white (binary) images, without any gray scale pixel values.

According to embodiments of the present disclosure, each of the camera pixels can comprise a bi-stable bit-storage device that can only store a single binary value, e.g., a single zero or a single one or a single bit (e.g., as a voltage). In some embodiments, each of the camera pixels comprises a charge storage device storing a charge corresponding to the incidence of light on the camera pixel and the bi-stable bit-storage device is responsive to the charge storage device to change the state of the bi-stable bit-storage device.

According to embodiments of the present disclosure, a method of operating an optical communication system can comprise changing the state of the bi-stable bit-storage device responsive to light incident on the camera pixel, e.g., each camera pixel. Methods of the present disclosure can comprise changing the state of the bi-stable bit-storage device responsive to light incident on the camera pixel.

According to embodiments of the present disclosure, a method of operating an optical communication system can comprise accumulating a charge responsive to light incident on the camera pixel and changing the state of the bi-stable bit-storage device responsive to the accumulated charge. In some embodiments, methods can comprise displaying a first image with the display at a first time, recording the first image at multiple second times after the first time, and displaying a second image with the display at a third time after the multiple second times. In some embodiments, methods of operating an optical communication system can comprise displaying an image on a display, operating a display sync pixel to signal that the image is displayed, and recording the image with a camera in response to the signal from the display sync pixel.

In some embodiments, the display comprises display pixels, the display sync pixel is a display pixel, and methods further comprise displaying the image on the display using matrix addressing. The display sync pixel can be a last pixel or one of a group of last pixels (e.g., a row or the bottom row in an array of display pixels in the display) displayed when an image frame is displayed on the display.

Embodiments of the present disclosure provide improvements in devices and methods for optical communication using a display and digital camera.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 12 is a schematic diagram of an optical communication system comprising a display and multiple digital cameras according to illustrative embodiments of the present disclosure;

FIGS. 13A and 13B are schematic diagrams of a display with display pixels that can display an encoded address according to illustrative embodiments of the present disclosure;

Figure 1:
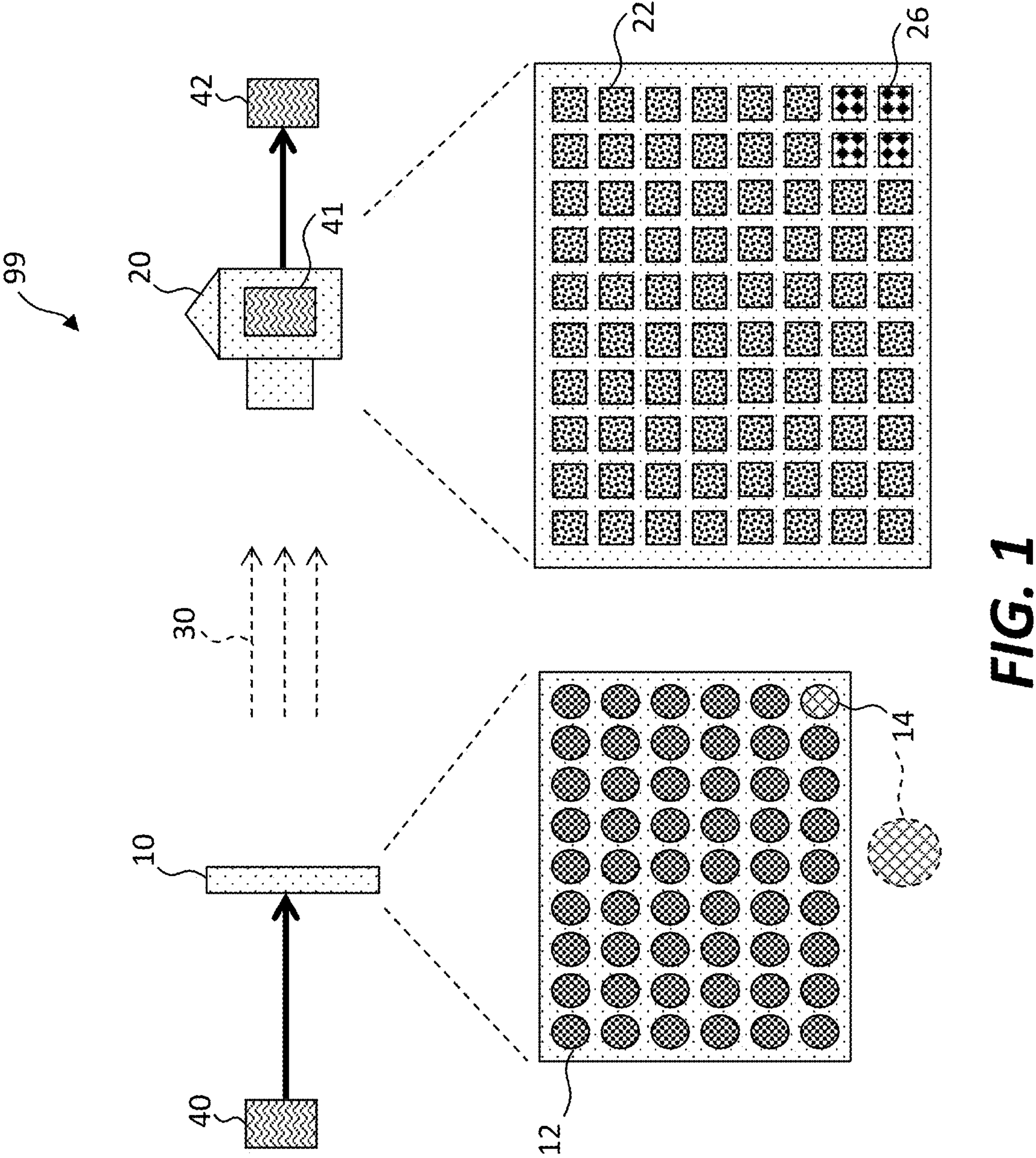
FIG. 1 is a schematic diagram of an optical communication system comprising a digital camera and a display with a display sync pixel, showing a side and front view of each, according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not necessarily drawn to scale.

Detailed Description of Certain Embodiments

Free-space optical communication systems can suffer from limited bandwidth because of a corresponding limitation in communication channels. Embodiments of the present disclosure provide, among other things, free-space communication systems with multiple channels providing increased bandwidth.

Figure 4:
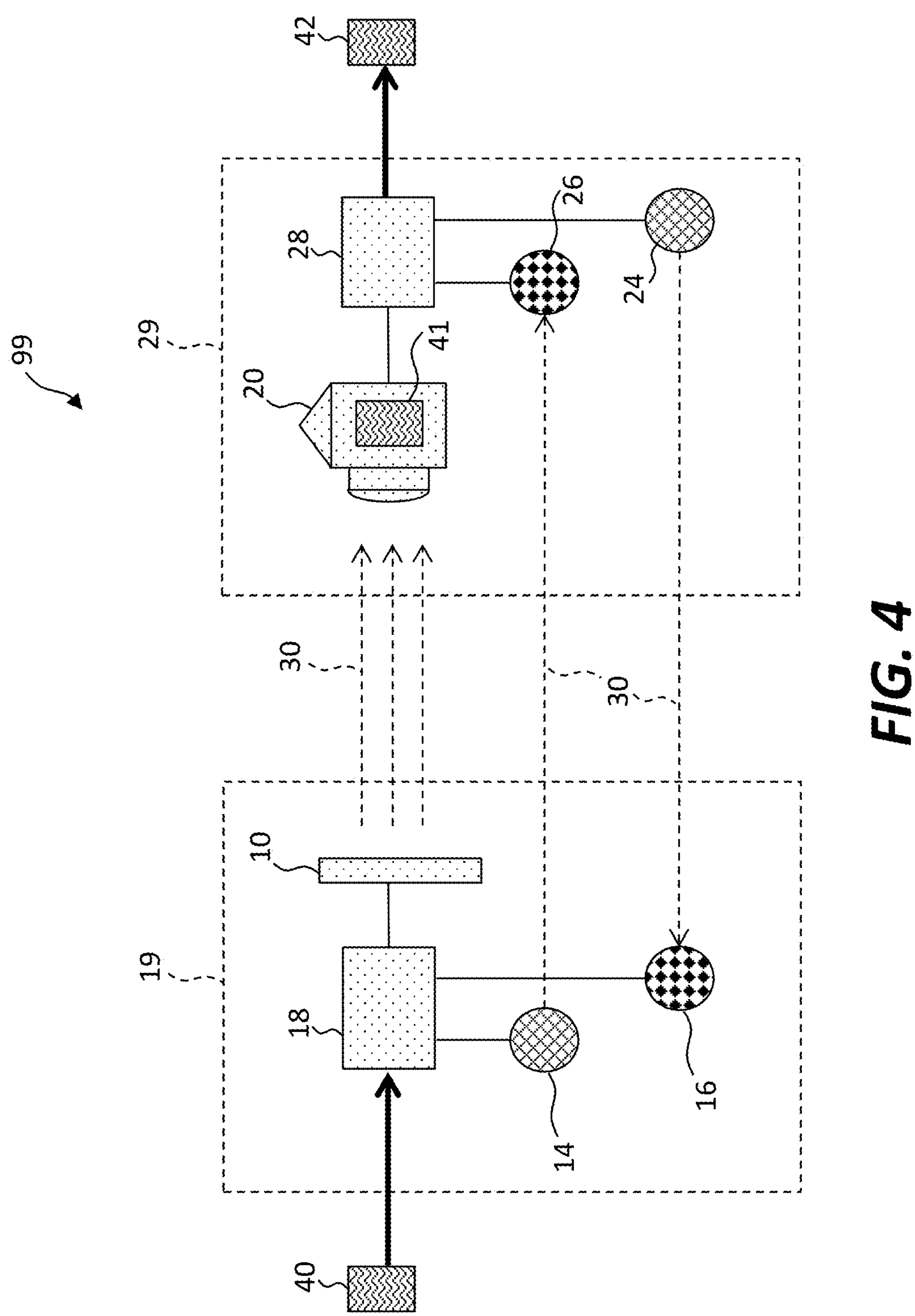
FIG. 4 is a schematic diagram of an optical communication system comprising a display with a display sync pixel external to the display and a digital camera with a camera sync pixel external to the camera according to illustrative embodiments of the present disclosure.

According to some embodiments of the present disclosure and as shown in FIGS. 1 and 4, an optical communication system 99 can comprise a display 10, a display sync pixel 14, and a digital camera 20. Display 10 can be a digital display 10 comprising display pixels 12 that each emit light 30 in response to received images 40 provided to display 10 and is therefore operable to display received images 40 on display 10 with display pixels 12. Digital camera 20 can comprise camera pixels 22 that respond to light 30 from the image exposed onto camera pixels 22 (e.g., imaged with an optical lens) and can be operable to capture an image 41 exposed onto camera pixels 22, optionally process, and record captured image 41 as a recorded image 42. Display sync pixel 14 is operable to signal digital camera 20 when display 10 displays received image 40. In some embodiments, display sync pixel 14 is one or more display pixels 12 disposed to emit light 30 from display 10 (as shown in FIG. 1). In some embodiments, embodiments, display sync pixel 14 is not one or more display pixels 12 and is separate from and external to display 10 (as shown in FIG. 4).

As used herein, an image received and displayed by display 10 is a received image 40. When captured by digital camera 20, the image is a captured image 41 that can include all of received image 40 and optionally more of an area around the displayed received image 40, for example optionally including an external display sync pixel 14. When recorded, the image is a recorded image 42 and can be an image-processed version of captured image 41. A recorded image 42 is stored or transmitted for subsequent processing, for example to decode information present in recorded image 42, for example by a computer or processor external to digital camera 20 or by camera circuit 28. In contrast, captured image 41 is transient and is only kept as necessary to determine if captured image 41 should be recorded as a recorded image 42. However, all of received, captured, and recorded images 40, 41, 42 can include information displayed on all of display pixels 12 or, in some embodiments, information displayed on a portion of display pixels 12.

In some embodiments, digital camera 20 can capture an image (captured image 41) from display 10, detect display sync pixel 14 and, responsive to display sync pixel 14, record the image (recorded image 42). Thus, digital camera 20 records image 42 only after received image 40 is displayed by display 10, ensuring that digital camera 20 and display 10 are properly synchronized and preventing digital camera 20 from recording an incorrect, incomplete, duplicate, or meaningless image. In some embodiments, digital camera 20 comprises a camera sync detector 26 that detects the state of display sync pixel 14. In some embodiments, camera sync detector 26 is one or more camera pixels 22 disposed to receive light 30 from display sync pixel 14 (as shown in FIG. 1). In some embodiments, camera sync detector 26 can be external to and separate from digital camera 20 (as shown in FIG. 4). As intended herein, an image captured by digital camera 20 can be used to detect the state of display sync pixel 14. A captured image 41 can be recorded for use or decoding when it is determined from display sync pixel 14 that captured image 41 is properly synchronized with display 10 and should be recorded (as recorded image 42).

While new received images 40 can be detected by comparing successive captured images 41, using a display sync pixel 14 and detecting changes in the state of display sync pixel 14 can require less processing, thereby reducing computing hardware needs and increasing processing and frame rates, thereby reducing costs and increasing data communication rates and improving performance.

Display 10 can be any multi-pixel display 10 that optically emits light 30 from display pixels 12. Display pixels 12 can be typically arranged in a regular array (e.g., a two-dimensional array in rows and columns) but can be disposed in any useful arrangement that can be captured by digital camera 20. Each received image 40 displayed by display 10 is an image frame (e.g., frame) and the number of different received images 40 that can be displayed per unit of time by display 10 is the display frame rate. Display 10 can be any display but can operate at higher frame rates with light emitters that can switch on and off faster, for example light-emitting diodes, and displayed images can be more readily detected with light emitters that are relatively bright, such as inorganic light emitters. In some embodiments, display pixels 12 of display 10 comprise inorganic light-emitting diodes (iLEDs), for example inorganic micro-light-emitting diodes (micro-iLEDs that can be assembled using micro-transfer printing). In some embodiments, each display pixel 12 comprises or is a single light emitter (such as an iLED for example emitting white light 30 or a color of light 30 such as red, green or blue, or even ultraviolet or infrared light so long as digital camera 20 is sensitive to emitted light 30). In some embodiments, display pixel 12 is or comprises a group of light emitters (for example each an iLED) that each emit a different color of light 30 and that are closer together or no farther apart than any two light emitters that emit the same color of light 30 in two different display pixels 12. Display 10 can be for example, a liquid crystal display, an electrophoretic display, an OLED display, or an iLED display; however, iLEDs can provide faster switching times, brighter light 30, and improved efficiency compared to other display pixels 12 and, in some embodiments, display 10 is an iLED display 10. In some embodiments, display 10 is a color display 10 that emits different colors of light 30 from each display pixel 12. In some embodiments, display 10 is a black-and-white display 10 that emits white light 30. In some embodiments, display 10 emits only red light 30, only green light 30, only blue light 30, only infrared light 30, or only ultraviolet light 30. The color of light 30 emitted by display 10 can be a color that is most efficient for an iLED to emit or that is most efficient and/or sensitive for a camera pixel 22 to capture (or a preferred combination of emission efficiency and capture sensitivity). (As used herein, light 30 refers to electromagnetic radiation that is emitted by display 10 or is captured by digital camera 20 and does not refer only to human-visible light.)

Digital camera 20 is any camera capable of digitally capturing and recording an image with an array of camera pixels 22. Each camera pixel 22 can be operable to record a portion of a displayed (received) image 40 exposed onto the array of camera pixels 22, e.g., with an optical imaging system comprising one or more lenses. Digital camera 20 can have more camera pixels 22 than display 10 has display pixels 12 so that digital camera 20 can record each of display pixels 12 and display sync pixel 14 with at least one and optionally multiple camera pixels 22, that can be combined to improve a signal-to-noise ratio of the light 30 captured by camera pixels 22. Digital camera 20 can be a black-and-white camera (e.g., provide binary pixel output or only capture a binary signal), can be responsive to only a single color of light 30, or can be a color digital camera 20 responsive to different colors of light 30 to capture and record a color image (e.g., captured image 41 and recorded image 42).

In some embodiments, camera pixels 22 each comprise a single light detector (such as a CCD or CMOS photodetector or light sensor) responsive to light 30 or a color of light 30. In some embodiments, camera pixels 22 each comprise multiple light detectors (such as CCD or CMOS photodetectors or light sensors) each responsive to a different color of light 30 (for example are exposed to light through different color filters). The multiple light detectors in a single camera pixel 22 can be closer together or no farther apart than any two light detectors that detect the same color of light 30 in different camera pixels 22. In some embodiments, multiple light detectors in a single camera pixel 22 can be responsive to a same color of light 30 (e.g., have no color filters or all have the same color filter), for example to provide redundant or more-sensitive detection of a common color of light 30 and improve a signal-to-noise ratio of the light 30 detected and captured by camera pixel 22. In some embodiments, digital camera 20 detects only white light 30, only red light 30, only green light 30, only infrared light 30, only blue light 30, or only ultraviolet light 30.

Display sync pixel 14 can be or comprise a light emitter (e.g., an iLED) that signals when display 10 is displaying a received image 40, for example a new image not displayed before on display 10. The term "sync" refers to "synchronization" because display sync pixel 14 synchronizes display 10 received image 40 display and digital camera 20 capturing image 41 or recording recorded image 42 at or after received image 40 is displayed by display 10. Thus, display sync pixel 14 is operable to signal digital camera 20 when received image 40 is displayed on display 10. In some embodiments, display sync pixel 14 is a display pixel 12, e.g., one of display pixels 12 of display 10 used to display received image 40. In embodiments, display pixels 12 are disposed in a two-dimensional array and display sync pixel 14 is one of display pixels 12 in the two-dimensional array (as shown in FIG. 1). In embodiments, light 30 emitted by display sync pixel 14 is a part of an image, for example a display pixel 12 that is set to a luminance value to indicate that the image is present, for example received image 40 displayed on display 10. In such embodiments, display sync pixel 14 can be controlled using the same mechanism or hardware or control signals as other display pixels 12.

In some embodiments, display sync pixel 14 is separate from display 10 and is not a display pixel 12 (although still referred to as a pixel for simplicity), for example an iLED physically disposed adjacent to display 10 and visible to digital camera 20 (as shown in FIG. 4). In embodiments, display pixels 12 are disposed in a regular array and display sync pixel 14 is spatially disposed separately from the regular array. In such embodiments, display sync pixel 14 can be controlled using a different mechanism, different hardware, or different control signals from display pixels 12. Digital camera 20 can capture the status of display sync pixel 14 at the same time that digital camera 20 captures display pixels 12, for example so that a single image captured by display camera 20 includes both display pixels 12 and display sync pixel 14.

Display sync pixel 14 can be detected by digital camera 20. Digital camera 20 can capture an image of display 10 (e.g., captured image 41, including any display sync pixel 14 whether part of received image 40 displayed on display 10 as shown in FIG. 1 or separate from display 10 as shown in FIG. 4), process captured image 41 to detect display sync pixel 14, and analyze the processed image to determine the state of display sync pixel 14, for example display sync pixel 14 emitting light 30 (e.g., turned On) or display sync pixel 14 not emitting light 30 (e.g., not turned On). Digital camera 20 can then respond to the determined state of display sync pixel 14.

Figure 2B:
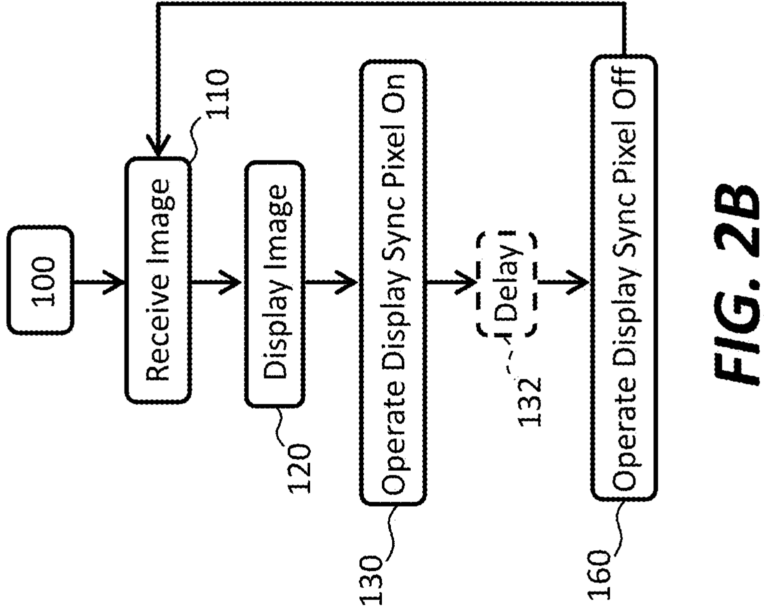
FIG. 2B is a flow diagram of display methods using a display sync pixel external to the display according to illustrative embodiments of the present disclosure.
Figure 2A:
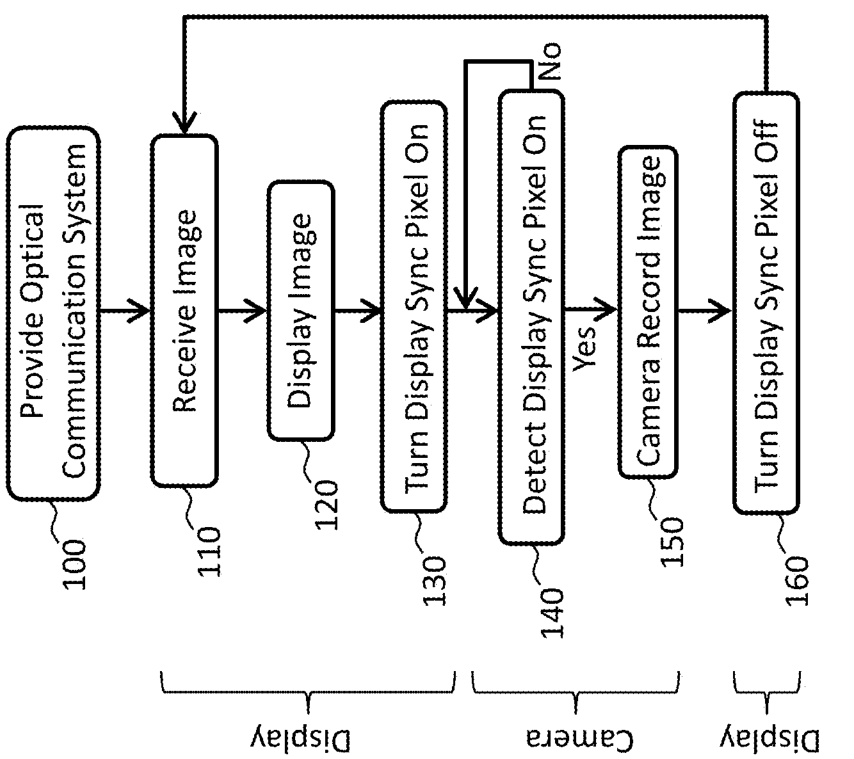
FIG. 2A is a flow diagram of methods using a display sync pixel external to the display according to illustrative embodiments of the present disclosure.

According to embodiments, a method of operating an optical communication system 99 as shown in FIG. 2A and FIG. 4 can comprise providing an optical communication system 99 in step 100, receiving received image 40 in step 110, and displaying received image 40 in step 120 (the steps 110, 120 of receiving and displaying received image 40 can be a common step so that receiving image 40 is also displaying received image 40). Once received image 40 is displayed in step 120, display sync pixel 14 is turned On to indicate a new received image 40 displayed in step 130 and the operation detected in step 140, for example by digital camera 20. If display sync pixel 14 operation is On and indicates a new received image 40, digital camera 20 responds by recording the new image in step 150, and the display sync pixel 14 can be turned off in step 160. If not, digital camera 20 checks the state of display sync pixel 14 again in step 140. The process can then repeat.

FIG. 2B illustrates the operation of display 10 for the method of FIG. 2A. Given the optical communication system 99 in step 100, display 10 can receive an image 40 in step 110, display received image 40 in step 120, and turn On display sync pixel 14 in step 130. Display sync pixel 14 can be disposed spatially adjacent to display 10 as shown in FIG. 4. Once display sync pixel 14 is turned On, display 10 can optionally delay (wait) in step 132 until digital camera 20 has an opportunity to capture and record received image 40, and then turn Off display sync pixel 14 in step 160, to reset display sync pixel 14 so that the process can repeat. Delay step 132 can have a period equal to or greater than the period of digital camera 20 frame rate to ensure that digital camera 20 has enough time to capture received image 40. In embodiments, if digital camera 20 has a capture frame rate faster (e.g., captures more images per second) than the display frame rate, the delay step 132 is not necessary.

Figure 2C:
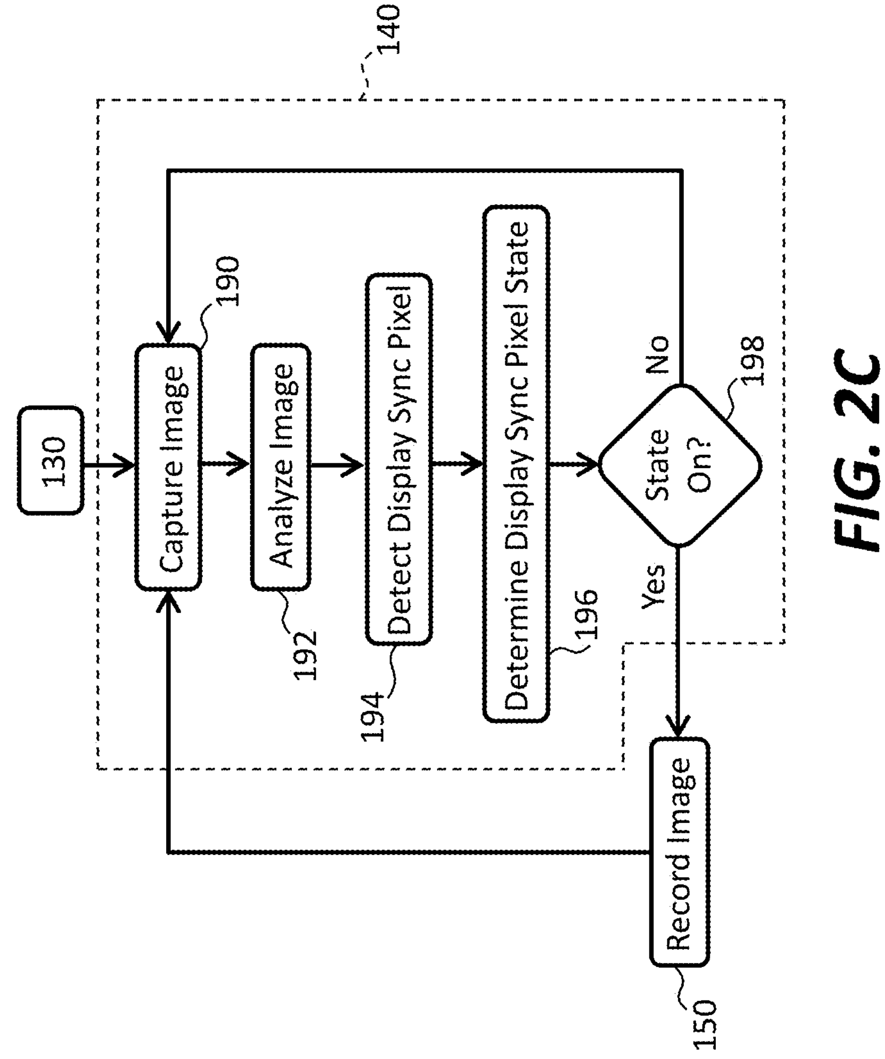
FIG. 2C is a flow diagram of digital camera methods testing a display sync pixel state On according to illustrative embodiments of the present disclosure.

FIG. 2C illustrates the operation of digital camera 20 for the method of FIG. 2A. Digital camera 20 begins by capturing an image 41 of a received image 40 from display 10 in step 190, analyzing the captured image 41 in step 192 to detect or locate the position of display sync pixel 14 in captured image 41 using logic or computing circuits in step 194 to process captured image 41, and determines the state of display sync pixel 14 in step 196. If the state of display sync pixel 14 is On, captured image 41 is recorded in step 150 as recorded image 42, and the process repeats with step 190. Recorded image 42 can be subsequently processed (e.g., by an external processor), for example to decode recorded image 42. If the state of display sync pixel 14 is not on, and therefore is Off and does not indicate a new displayed received image 40 on display 10, the process repeats with step 190 without recording captured image 41 in step 150. Steps 190-198 can be a display sync pixel 14 state detection step 140 On, as indicated with the dashed enclosure in FIG. 5C. As long as the digital camera 20 image capture frame rate is faster than the display frame rate, this process should record every different image displayed on display 10.

Figure 3B:
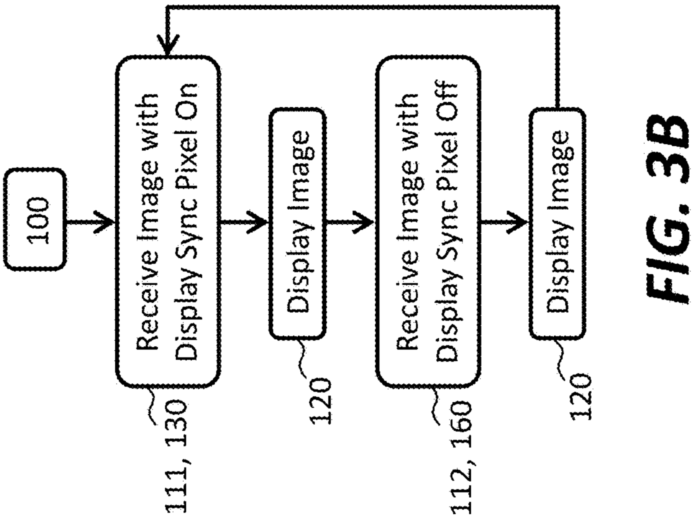
FIG. 3B is a flow diagram of display methods using a display sync pixel internal to the display according to illustrative embodiments of the present disclosure.
Figure 3A:
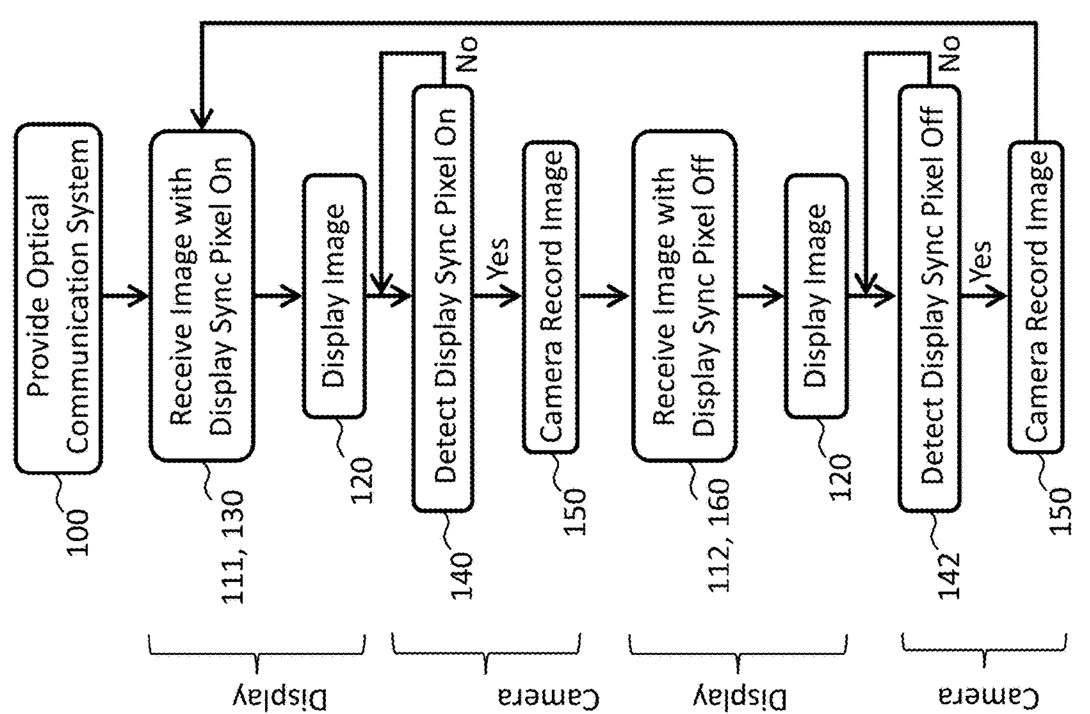
FIG. 3A is a flow diagram of methods using a display sync pixel internal to the display according to illustrative embodiments of the present disclosure.

In some embodiments and as illustrated in the schematic diagram of FIG. 1 and the flow diagram of FIG. 3A, display sync pixel 14 is integrated into or is a part of display 10 and is a display pixel 12. In some such embodiments, step 120 of displaying a received image 40 with display 10 and turning the display sync pixel 14 on or off (step 130) can be the same step. Display 10 can be matrix addressed (e.g., by a display controller), can update a received image 40 on display 10 by rows of display pixels 12 and display sync pixel 14 can be in (a part of) the last row of display pixels 12 updated (e.g., the bottom row of display pixels 12, as shown in FIG. 1, so that when digital camera 20 captures received image 40, received image 40 is completely displayed on display 10).

FIG. 3A also illustrates the use of alternating (e.g., On then Off then On then Off, etc.) display sync pixel 14 states to indicate new received images 40 by display 10. Such a method does not require resetting display sync pixel 14 in step 160 as shown in FIG. 2A and is therefore somewhat more efficient in operation. As shown in FIG. 3A, an optical communication system 99 is provided in step 100, display 10 receives an image 40 with an integrated display sync pixel 14 On in step 111 (and therefore step 130) and displays received image 40 in step 120 (steps 111, 120, 130 can be a common step so that receiving an image 40 with display sync pixel 14 On is also displaying received image 40 in step 120 and turning display sync pixel 14 on in step 130). Image 40 received in step 111 can have an image pixel (e.g., display sync pixel 14) corresponding to a pre-determined display pixel 12 that is On. The display sync pixel 14 On state is detected by digital camera 20 in step 140 (as shown in FIG. 2C) by analyzing a captured image 41 and then, if display sync pixel 14 is On, responding by recording captured image 41 to make recorded image 42 in step 150. If display sync pixel 14 is not On (e.g., is Off and has not changed state), digital camera 20 captures and analyzes received image 40 again until a received image 40 with display sync pixel 14 On is found by digital camera 20. In step 112, display 10 receives a next received image 40 with display sync pixel 14 Off (also step 160) and displays the next received image 40 in step 120 (steps 112, 120, 160 can be a common step so that receiving an image 40 with display sync pixel 14 Off is also displaying received image 40 in step 120 and turning display sync pixel 14 Off in step 160). The display sync pixel 14 Off state is detected by digital camera 20 by analyzing a captured image 41 in step 142 (shown in FIG. 3C) and then, if display sync pixel 14 is Off, responding by recording the next received image 40 to make recorded image 42 in step 150. If display sync pixel 14 is not Off (e.g., is On and has not changed state), digital camera 20 captures and analyzes received image 40 again until a received image 40 with display sync pixel 14 Off is found by digital camera 20. The process then repeats with a next received image 40 having display sync pixel 14 On. Display 10 can receive images 40 with an embedded display sync pixel 14 in the desired state or can write the state of display sync pixel 14 into received image 40 prior to displaying the image in step 120. In some embodiments, display sync pixel 14 is rewritten in a second step to the desired On or Off state after received image 40 is displayed in a first step.

FIG. 3B illustrates the process of display 10 for the method of FIG. 3A. Given the optical communication system 99 in step 100, display 10 can receive an image 40 with display sync pixel 14 On in step 111 and display received image 40 in step 120. Because display sync pixel 14 is a display pixel 12 and can be On already, no separate step of turning display sync pixel 14 On is necessary since the step of displaying the image (step 111) serves to operate display sync pixel 14 (step 130 in FIG. 2A). Alternatively, in some embodiments, display sync pixel 14 of received image 40 can be turned On in step 130 (shown in FIG. 2A but not shown in FIG. 3A). Essentially, steps 111, 120, and 130 of FIG. 2A can be a common step or step 130 can be done before (or after) step 120. Once displayed, a new received image 40 with display sync pixel 14 Off is received in step 112 and displayed in step 120. (If received image 40 has an embedded display sync pixel 14 that is not Off, display sync pixel 14 can be turned Off in step 160 before displaying the image in step 120, otherwise step 160 is unnecessary.) The process then repeats. If the images are provided to display 10 with embedded display sync pixel 14 set to the appropriate state (On then Off then On then Off, etc.), then display 10 simply receives an image in step 110, displays the image in step 120, and repeats, e.g., as a conventional display 10 receiving and displaying a sequence of images, with no other operational steps required providing a very simple method.

Figure 3C:
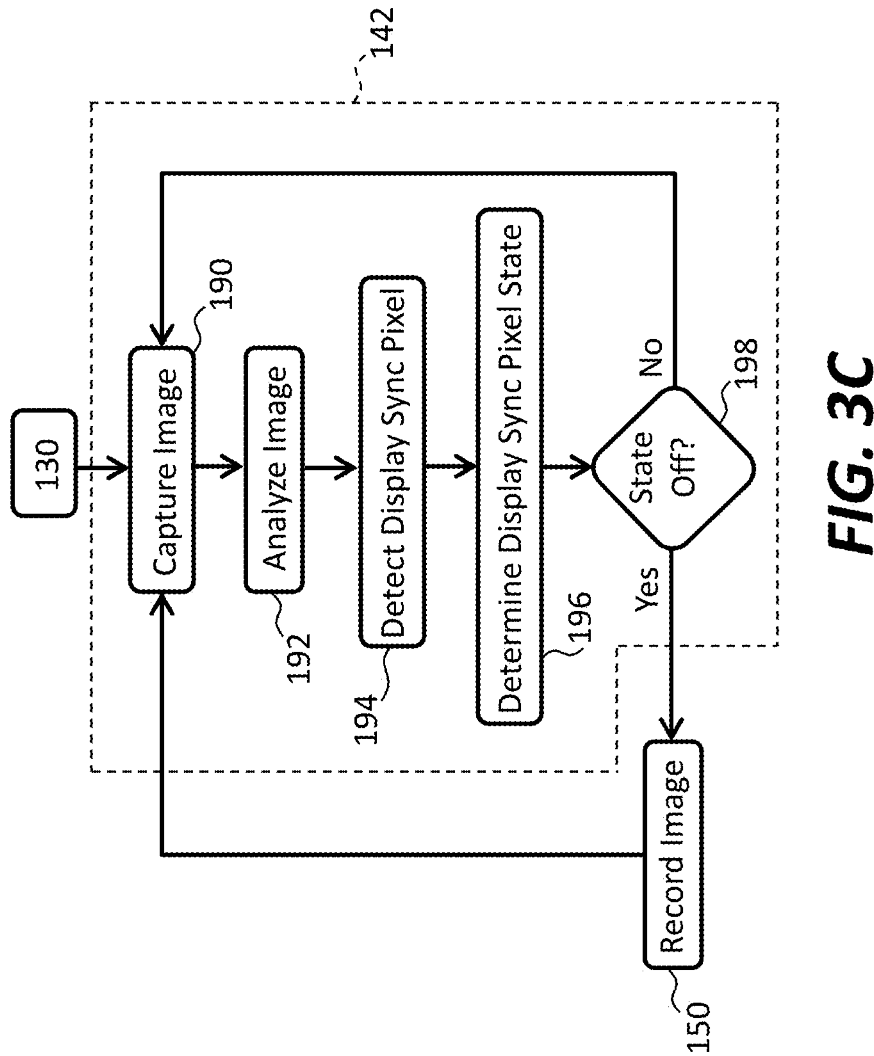
FIG. 3C is a flow diagram of digital camera methods testing a display sync pixel Off according to illustrative embodiments of the present disclosure.

The operation of digital camera 20 for the first part of the method of FIG. 3A can be the same as is shown or illustrated in FIG. 2C. For the second part of the method of FIG. 3A, the only difference from the method of FIG. 2C and as shown in FIG. 3C is that the display sync pixel 14 state in the displayed received image 40 is tested for Off in step 142 rather than tested for On in step 140. In the embodiments of FIGS. 3A-3C, because digital camera 20 only needs to record display pixels 12, digital camera 20 can require fewer camera pixels 22 that can detect display pixels 12, since no camera pixels 22 need be used to detect a separate display sync pixel 14 located outside of and adjacent to display 10, reducing digital camera 20 costs.

In some embodiments, digital camera 20 has an image capture (recording) frame rate equal to or greater than a display frame rate of display 10 (e.g., a camera frame rate equal to or faster than a display frame rate at which display 10 receives and displays images, e.g., one and a half or twice as fast). In the embodiments of FIGS. 2A, 2C, and 3A, 3C digital camera 20 can be implemented with a state machine or computing circuits in digital camera 20 to capture and analyze captured image 41 to detect the display sync pixel 14 state, e.g., using image processing.

In the methods of FIGS. 2A, 2B, and 2C, digital camera 20 can record a new image 42 each time display sync pixel 14 is turned On (e.g., when display sync pixel 14 changes state from Off to On, step 140). Otherwise, digital camera 20 continues capturing and analyzing images without recording the captured images 41 in step 140 and as shown in more detail in FIG. 2C. Digital camera 20 can analyze a series of captured images 41 to detect the status of display sync pixel 14, e.g., using image processing. Digital camera 20 can maintain a state machine corresponding to the status of display sync pixel 14. If display sync pixel 14 changes from an Off state to an On state, digital camera 20 records the image 42. If display sync pixel 14 maintains an On state, changes from an On state to an Off state, or maintains on Off state, digital camera 20 can be operable to continue capturing and analyzing captured images 41 without recording them.

In the methods of FIGS. 3A, 3B, and 3C, digital camera 20 can record the new image each time display sync pixel 14 changes state, either from Off to On (step 140) or from On to Off (step 142). Digital camera 20 can analyze a series of captured images 41 to detect the status of display sync pixel 14, e.g., using image processing, and can maintain a state machine corresponding to the status of display sync pixel 14. If display sync pixel 14 does not change state, digital camera 20 continues capturing and analyzing captured images 41 without recording captured images 41.

In all cases, display sync pixel 14 state On can be operationally exchanged with display sync pixel 14 state Off. The logical operations can be the same in either configuration.

In some embodiments of the present disclosure and as shown in FIG. 4, optical communication system 99 can comprise a display system 19 and camera system 29, for example each disposed on a printed-circuit board and comprising digital integrated circuits, light-emitting diodes, light sensors, and optical components such as lenses for directing light 30. Display system 19 can comprise a display 10 and a display circuit 18 operable to (i) receive images and control display 10 to display the received image 40, (ii) control display sync pixel 14 to emit light 30, and (iii) control and respond to a display sync detector 16 that detects light 30 from camera system 29. Correspondingly, camera system 29 can comprise a digital camera 20 for capturing images on display 10 and a camera circuit 28 operable to (i) analyze and record captured images 41 as recorded images 42 and (ii) control and respond to a camera sync detector 26 that detects light 30 emitted from display sync pixel 14. In some embodiments, camera sync detector 26 is simply camera circuit 28 for detecting the state of display sync pixel 14 in a captured image 41. In other embodiments, camera sync detector 26 is separate from digital camera 20 and any captured images 41, for example a photodetector that detects light 30 from display sync pixel 14 under the control of camera circuit 28.

In some embodiments, camera circuit 28 can control a camera sync light emitter 24 that emits light 30 detected by display sync detector 16 controlled by display circuit 18. Camera sync light emitter 24 (e.g., an iLED or laser) can be operated to signal that digital camera 20 has recorded the captured image 41 of display 10 as a recorded image 42 in response to display sync pixel 14. Display sync detector 16 can detect the state of camera sync light emitter 24 and digital camera 20 can respond to the detected state of camera sync light emitter 24. Display sync detector 16 can be a light sensor such as a photodiode or a camera with any useful optics (e.g., lenses) operable to capture an image of camera sync light emitter 24. Such a captured image 41 can be analyzed to determine the state of camera sync light emitter 24. In response to the determined state, display sync pixel 14 can be turned On or Off or display 10 can display an image, e.g., a next received image 40 in a sequence of images.

Display circuit 18 can process received images 40, for example if display sync pixel 14 is a display pixel 12 operating display sync pixel 14, e.g., indicating display sync pixel 14 On or Off. Camera circuit 28 can process captured images 41, for example for example analyzing captured images 41, detecting display sync pixel 14 with camera sync detector 26 (that can be a camera pixel 22), and determining a state of display sync pixel 14. Camera circuit 28 can also record captured images 41 or output captured images 41 for external recording, e.g., as recorded image 42. In embodiments, display circuit 18 is incorporated in display 10, or vice versa, or is separate from display 10. In embodiments, camera circuit 28 is incorporated in digital camera 20, or vice versa, or is separate from digital camera 20. Display and camera circuits 18, 28 can comprise digital logic or computing circuits. In FIG. 4, received image 40 from an external source is also indicated by an arrow that indicates transmitting received image 40 to display circuit 18 or display 10 where it is sensed as a captured image 41. Similarly, recorded image 42 is also indicated by an arrow that indicates transmitting recorded image 42 to or from display circuit 18 or digital camera 20 for external use, such as decoding information from recorded image 42 by an external computer or circuit.

Figure 5B:
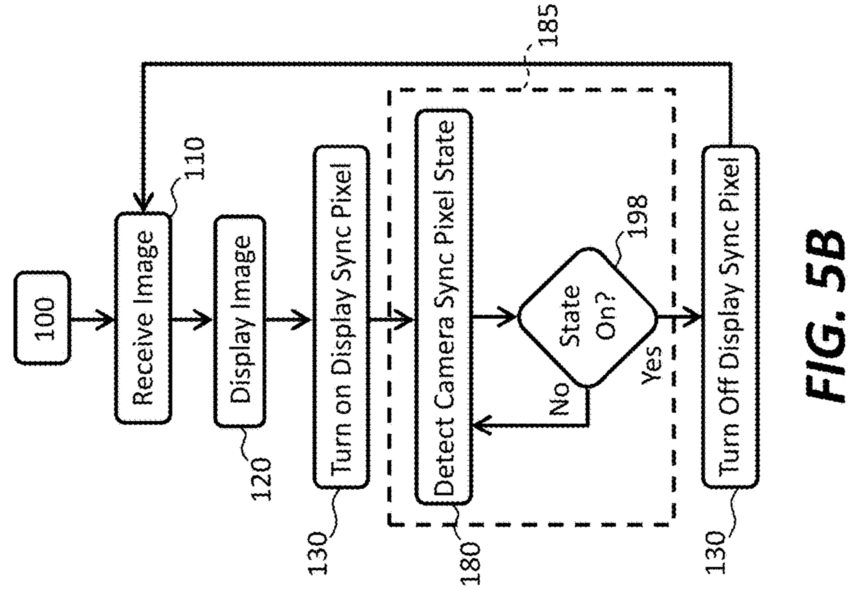
FIG. 5B is a flow diagram of display methods using a display sync pixel external to the display and a camera sync light emitter according to illustrative embodiments of the present disclosure.
Figure 5A:
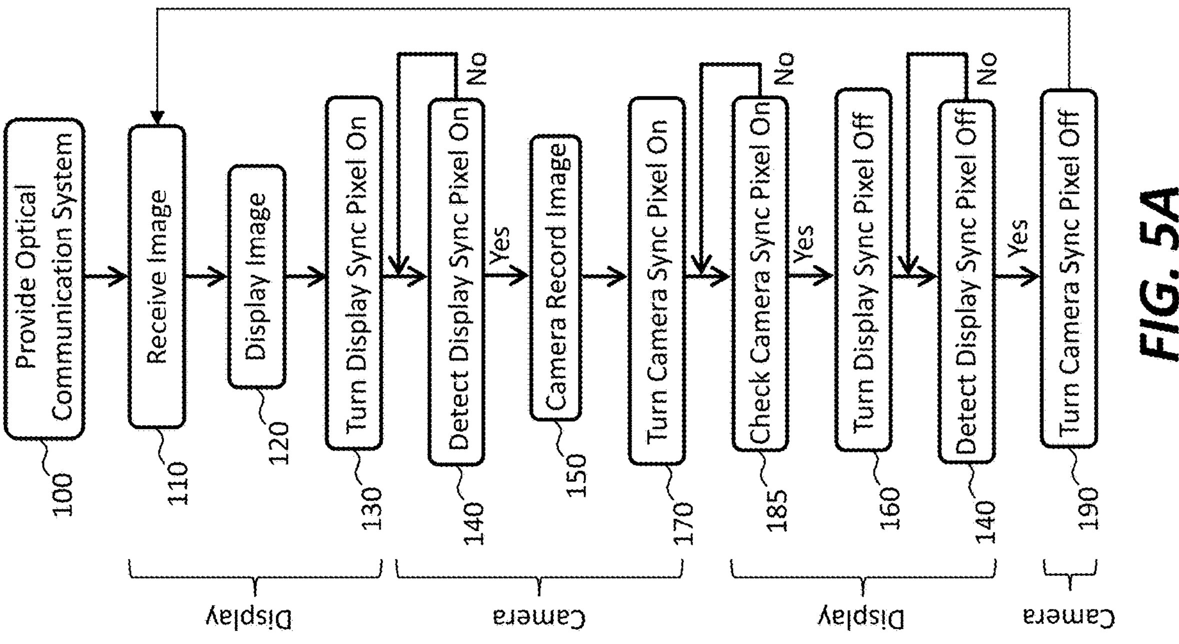
FIG. 5A is a flow diagram of methods using a display sync pixel external to the display and a camera sync light emitter according to illustrative embodiments of the present disclosure.

FIG. 5A illustrates some embodiments of the present disclosure using camera sync light emitter 24 and display sync detector 16. As shown in FIG. 5A, an optical communication system 99 is provided in step 100, an image 40 received in step 110, and displayed in step 120 (the steps 110, 120 of receiving and displaying received image 40 can be a common step so that receiving an image 40 is also displaying received image 40). Once the image is displayed in step 120, display sync pixel 14 is operated, for example turned on in step 130 (or can be inherent in received image 40 as in FIGS. 3A-3C), to indicate that a new received image 40 is shown on display 10. Digital camera 20 detects the display sync pixel 14 change in state to On in step 140 and responsive to the change records captured image 41 in step 150, e.g., providing recorded image 42 (or continues to capture images 41 until a state change to On is detected). Camera sync light emitter 24 is operated (e.g., turned On) in step 170 to indicate that captured image 41 is recorded as recorded image 42. Display sync detector 16 checks that the new captured image 41 is recorded in step 185 by detecting camera sync light emitter 24 is On (or rechecking until it is) so the process can be reset by turning off display sync pixel 14 in step 160, noted by digital camera system 29 in step 140, after which camera sync light emitter 24 can be turned off in step 190. The process can then repeat when display 10 receives a new received image 40.

FIG. 5B illustrates the steps of display 10 for the methods of FIG. 5A. Given the optical communication system 99 in step 100, display 10 can receive an image 40 in step 110, display received image 40 in step 120, and turn On (e.g., operate) display sync pixel 14 in step 130 to indicate that a new received image 40 is displayed on display 10. Display sync pixel 14 can be disposed spatially adjacent to display 10 or disposed as a part of received image 40. To operate display sync pixel 14 is to change the state of display sync pixel 14 to a desired state, e.g., to turn it On or Off. Once display sync pixel 14 is operated in step 130 (or received in the proper state as a display pixel 12 in received image 40), display sync detector 16 operates in step 180 (e.g., checks for light 30 output from camera sync light emitter 24). In step 198, if camera sync light emitter 24 is Off ("No"), display sync detector 16 operates again in step 180 and tested in step 198 until camera sync light emitter 24 is On ("Yes"), indicating digital camera 20 has recorded the displayed received image 40. ("On" and "Off", "No" and "Yes" are arbitrary designations.) The steps of detecting and testing camera sync light emitter 24 state 180, 198 can be a check camera sync light emitter 24 step 185 (e.g., similar to step 141 in digital camera system 29). Display sync pixel 14 is then turned Off, indicating that a new display cycle can begin, and a new image 40 received in step 110. This method avoids wait step 132 (as shown in FIG. 2B) and implements a bi-directional handshake between display 10 and digital camera 20.

Figure 5C:
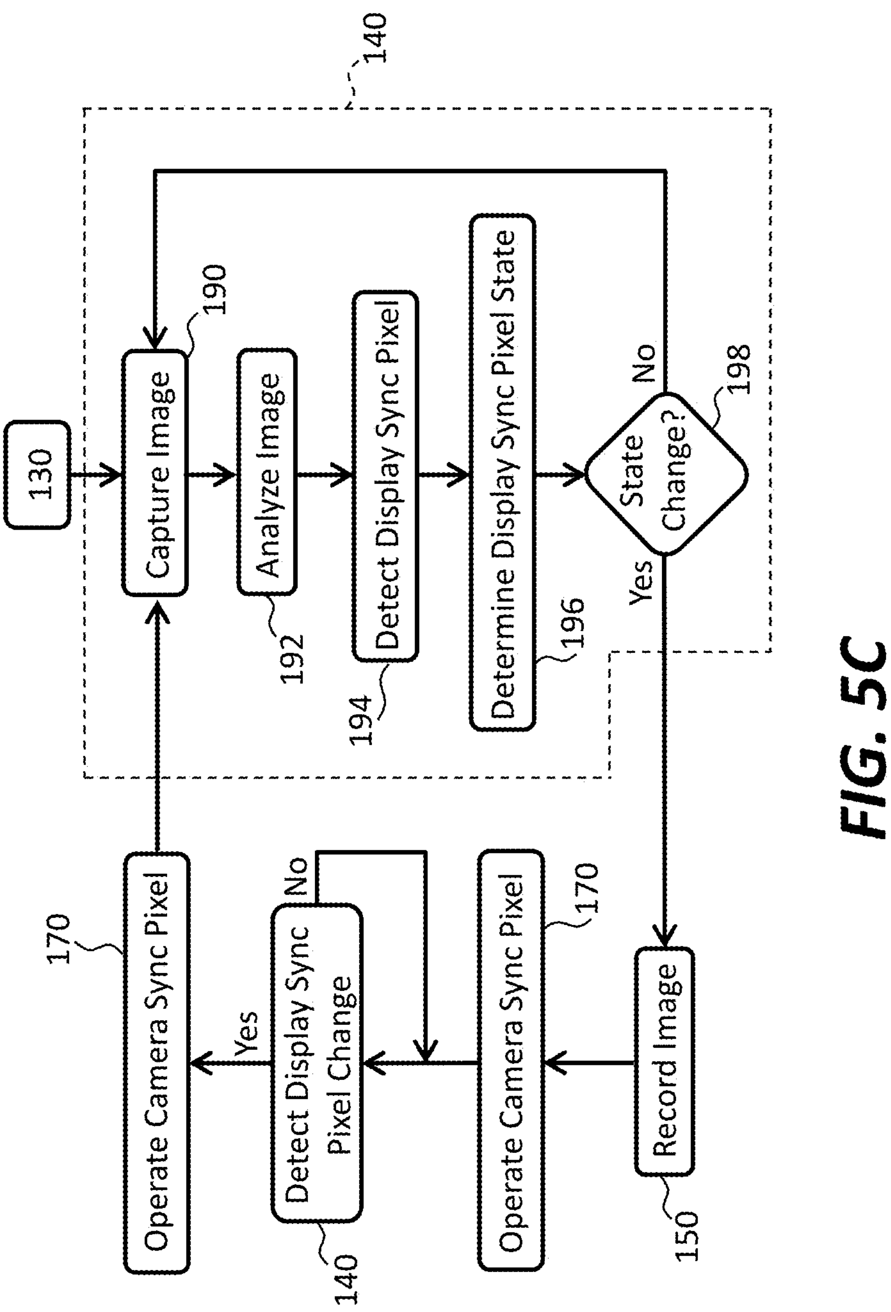
FIG. 5C is a flow diagram of digital camera methods using a display sync pixel external to the display and a camera sync light emitter according to illustrative embodiments of the present disclosure.

FIG. 5C illustrates the steps of digital camera 20 for methods of FIG. 5A. Digital camera 20 begins by capturing a received image 40 from display 10 in step 190 to make captured image 41, analyzing captured image 41 in step 192 to detect or locate the image of display sync pixel 14 in captured image 41 using logic or computing circuits in step 194, and determining the state of display sync pixel 14 in step 196. If the state of display sync pixel 14 is changed (determined for example by comparing the state to a previous saved state in step 198), captured image 41 is recorded to make recorded image 42 in step 150, camera sync light emitter 24 is operated (e.g., turned On), display sync pixel 14 is detected in step 140 and when display sync pixel 14 changes state (step 140), camera sync light emitter 24 is operated (e.g., turned Off) in step 170, and the process repeats with step 190. If the state of display sync pixel 14 is not changed, the process waits until display 10 is ready to proceed with a new received image 40. Steps 190-198 can be a display sync pixel 14 state detection step 141, as indicated with the dashed enclosure in FIG. 5C. By using a bi-directional handshake, methods such as those of FIG. 5C can operate with any relative display or capture frame rate.

As shown in FIGS. 5A-5C, optical communication system 99 can operate by detecting changes in display sync pixel 14 and camera sync light emitter 24 state but can also operate with an explicit change to an Off or On state (e.g., as shown in FIGS. 2A-2C. 3A-3C). Thus, in some embodiments, display sync pixel 14 can alternate states to indicate or signal a new received image 40 displayed on display 10, rather than exclusively turning On or exclusively turning Off. Similarly, camera sync light emitter 24 can alternate states to indicate or signal a new image 42 recorded by digital camera 20, rather than exclusively turning On or exclusively turning Off. In such embodiments, display sync pixel 14 can be a display pixel 12 or separate from display pixels 12.

Figure 6:
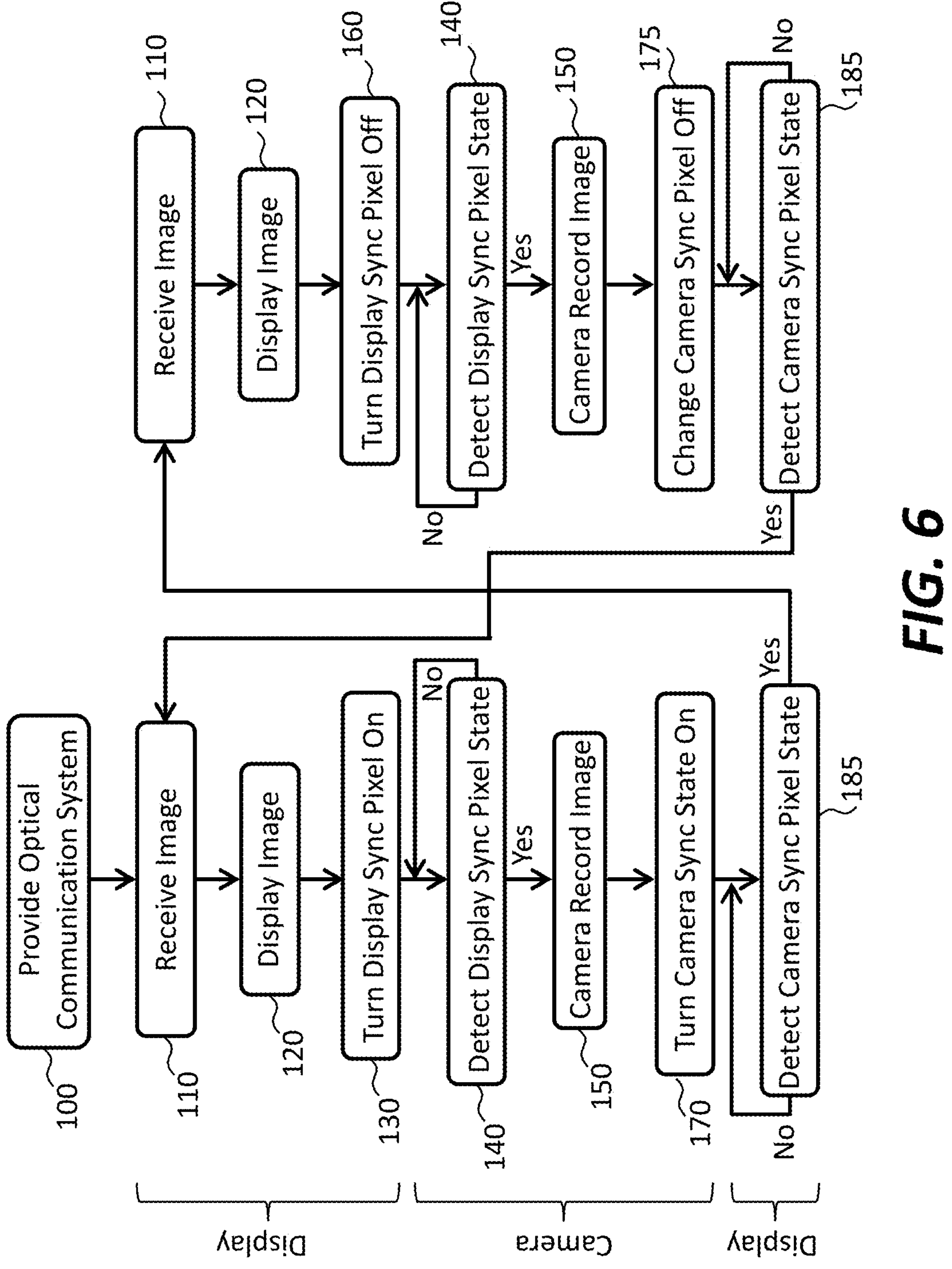
FIG. 6 is a flow diagram of methods using a camera sync light emitter and a display sync pixel external to the display using state changes to control display and digital camera synchronization according to illustrative embodiments of the present disclosure.

FIG. 6 illustrates embodiments in which display sync pixel 14 is separate from display pixels 12 and alternates states to signal new displayed received images 40 and in which camera sync light emitter 24 alternates states to signal new recorded images 42. As shown in FIG. 6, an optical communication system 99 is provided in step 100, an image 40 is received in step 110 and displayed in step 120 by display 10 (the steps 110, 120 of receiving and displaying received image 40 can be a common step so that receiving an image 40 is also displaying received image 40) and display sync pixel 14 turned On. Once received image 40 is displayed in step 120 and responsive to the display sync pixel 14 On state, digital camera 20 waits for and detects the display sync pixel 14 change in state in a captured image 41 in step 140 and then records the captured image 41 in step 150 as recorded image 42. Camera sync light emitter 24 is operated (e.g., turned On) in step 170 to indicate that the new recorded image 42 is recorded. Display sync detector 16 in display 10 checks for and waits until the new image is recorded in step 185 and display 10 then receives a new received image 40 in step 110. The process then repeats except that display sync pixel 14 is turned Off in step 160 and camera sync light emitter 24 is turned Off in step 175. The entire process can then begin again.

Figure 7:
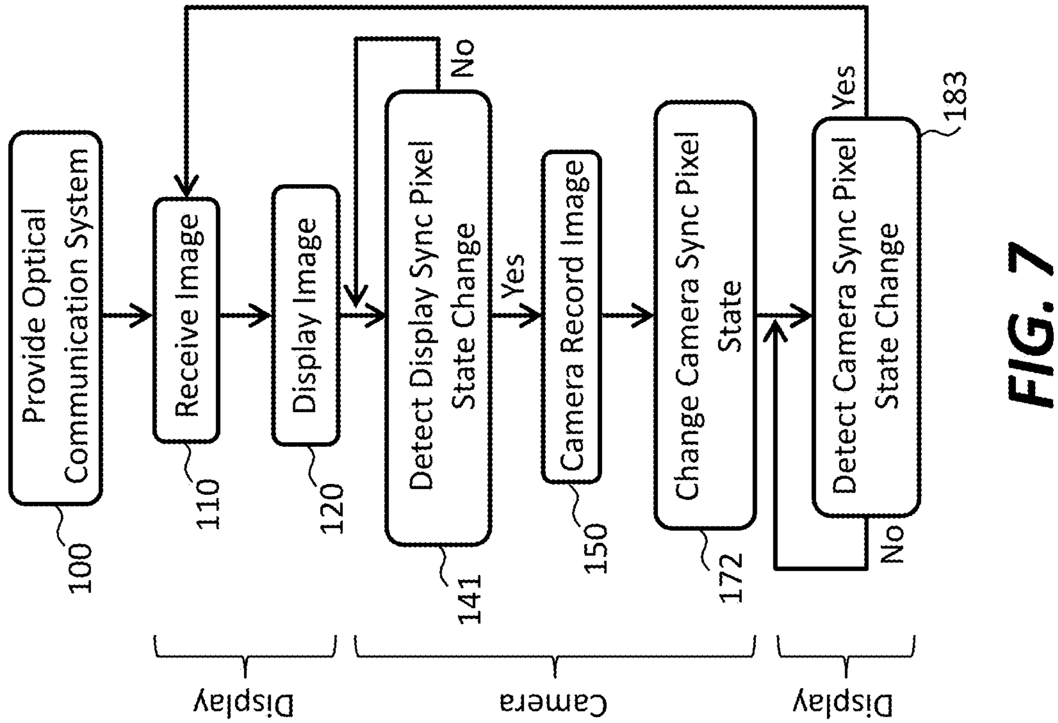
FIG. 7 is a flow diagram of methods using a camera sync light emitter and a display sync pixel internal to the display using state changes to control display and digital camera synchronization according to illustrative embodiments of the present disclosure.

FIG. 7 illustrates embodiments in which display sync pixel 14 is a display pixel 12 and alternates states to signal newly displayed received images 40 and in which camera sync light emitter 24 alternates states to signal new recorded images 42. As shown in FIG. 7, an optical communication system 99 is provided in step 100, a received image 40 with display sync pixel 14 in a given state is received in step 110 (or display sync pixel 14 is set in step 130 or 160, not shown in FIG. 7) and displayed in step 120 (the steps 110, 120, and optionally 130 or 160, of receiving and optionally setting display sync pixel 14, and displaying received image 40 can be a common step so that receiving an image 40 is also displaying received image 40 and setting display sync pixel 14). Once received image 40 is displayed in step 120 and, responsive to display sync pixel 14, digital camera 20 detects the display sync pixel 14 change in state in step 141 and therefore records new recorded image 42 in step 150. Camera sync light emitter 24 changes state in step 172 to indicate that newly received image 40 is recorded as recorded image 42 in step 150. In step 183 display sync detector 16 checks that the new recorded image 42 is recorded by waiting for a state change. The process can then begin again when display 10 receives a new received image 40 with display sync pixel 14 in a different state.

Figure 8B:
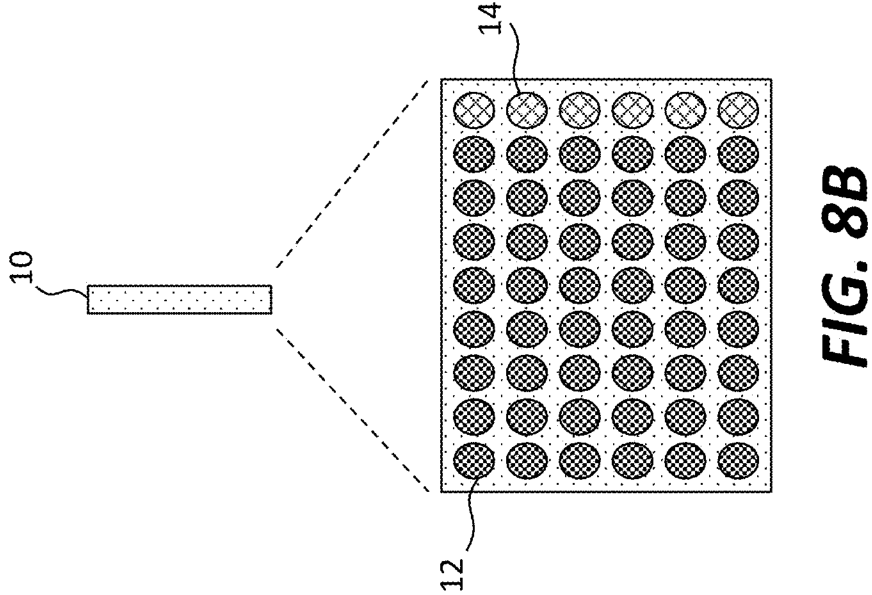
FIG. 8A is a schematic diagram of a side view and front view of a one-dimensional display and FIG. 8B is a schematic diagram of a side view and front view of a two-dimensional display with a display sync pixel for each row of the display according to illustrative embodiments of the present disclosure.
Figure 8A:
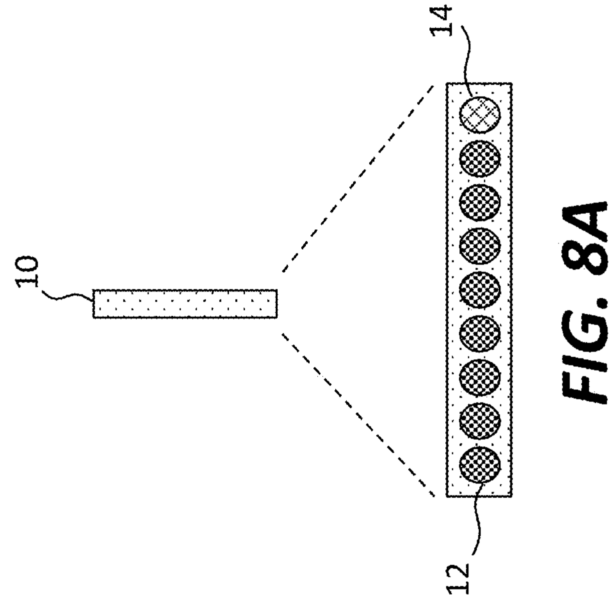

In embodiments of the present disclosure and as shown in FIG. 1, display pixels 12 can be disposed in a two-dimensional array and display sync pixel 14 can be one of display pixels 12 in the two-dimensional array. In some embodiments and as shown in FIG. 4, display pixels 12 are disposed in a regular array and display sync pixel 14 is spatially disposed separately from the regular array. In some embodiments, and as shown in FIG. 8A, display pixels 12 are disposed in a one-dimensional array and display sync pixel 14 is one of display pixels 12 in the one-dimensional array. In some embodiments, and as shown in FIG. 8B, display pixels 12 can be disposed in multiple one-dimensional arrays and each of the one-dimensional arrays of display pixels 12 can comprise a display sync pixel 14 (e.g., forming a two-dimensional array that is treated as multiple one-dimensional arrays). In such embodiments, signals can be sent from display 10 to digital camera 20 as one-dimensional images and can temporally overlap displaying and recording sequences of one-dimensional signals, possibly increasing data rates.

According to embodiments of the present disclosure, display sync pixel 14 is operable to signal that an image is displayed on display 10 by emitting light 30 (e.g., turning On) or by ceasing to emit light 30 (e.g., turning Off), or by alternately turning On or Off. The phrase “turn On” or “change state” can collectively refer to turning on, turning off, and alternately turning on and off.

In embodiments of the present disclosure, images can be binary images with display or camera pixels 12, 22 that are either On or Off. Such embodiments can be efficient if display pixels 12 comprise iLEDs operated at a desired current density. In some embodiments, each display and camera pixel 12, 22 has multiple different values, e.g., an eight-bit value, corresponding to a luminance of the pixel. In such embodiments, more information can be transmitted in each signal.

Figure 9:
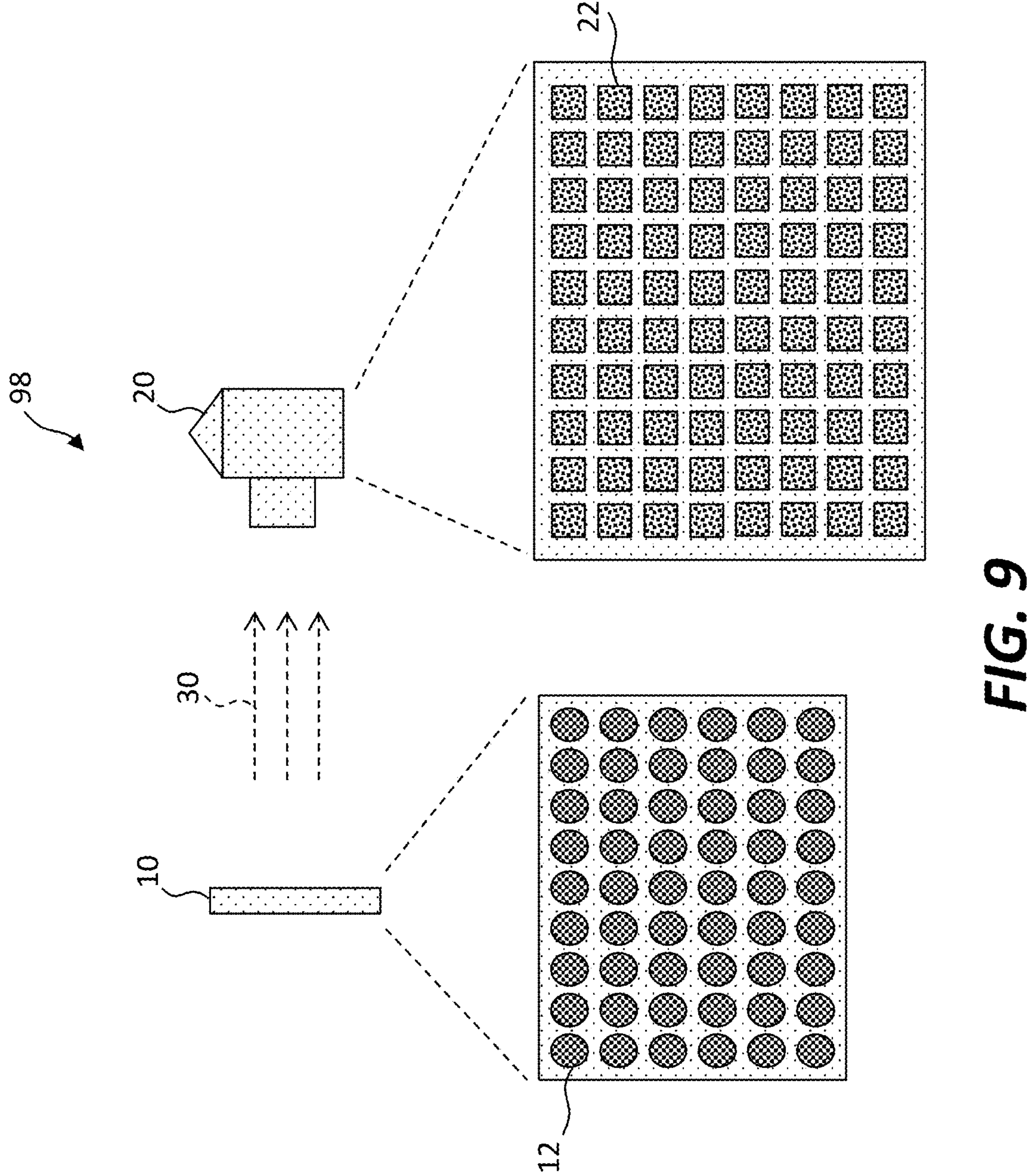
FIG. 9 is a schematic diagram of an optical communication system comprising a display and digital camera with no synchronization pixels, showing a side and front view of each, according to illustrative embodiments of the present disclosure.

In some embodiments of the present disclosure, an optical communication system 98 can comprise a display 10 and digital camera 20 that are not synchronized and do not include sync pixels or light emitters. Display 10 can operate independently of digital camera 20. In order to ensure that digital camera 20 does not miss any images on display 10, digital camera 20 can operate at a faster camera frame rate than display 10 can operate at a display frame rate. FIG. 9 illustrates such an optical communication system 98. As shown in FIG. 9, an optical communication system 98 can comprise a display 10 comprising display pixels 12 operable to display an image on display 10 with display pixels 12 at a display frame rate and a digital camera 20 disposed and operable to record the image at a camera frame rate. The camera frame rate can be equal to or greater than the display frame rate. Such an optical communication system 98 can be relatively simple and requires no complex timing interactions between display 10 and digital camera 20. Each captured image 41 captured by digital camera 20 can be compared to a prior recorded image 42 and, if the images are different, the new captured image 41 is recorded as the next recorded image 42 and becomes the comparison image for the next captured image 41. If the captured 41 and recorded 42 images are the same (e.g., no new image is present), captured image 41 is not recorded and a new image 41 is captured. In this way, display 10 and digital camera 20 can be synchronized to only record changes in received images 40 and no additional synchronization is needed, but only if the camera frame rate is at least as fast (and preferably faster) than the display frame rate.

Figures 10A, 10B:
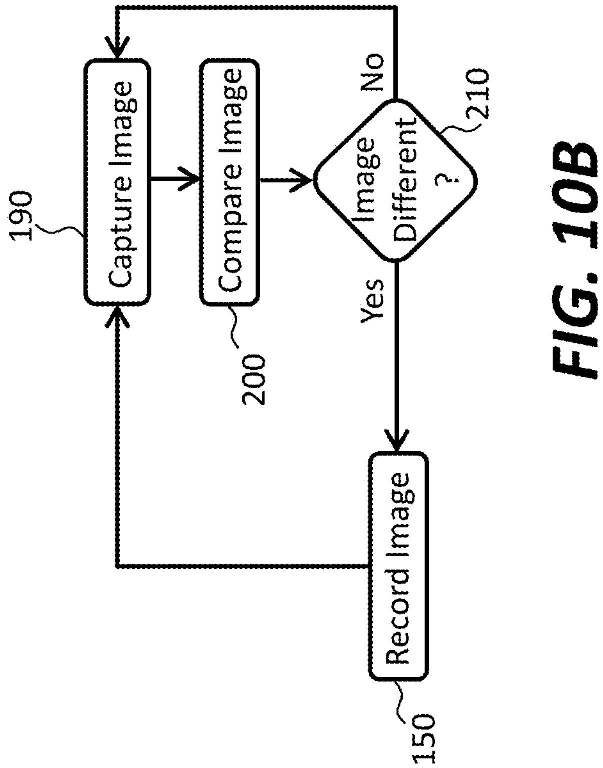
FIG. 10A is a flow diagram of display methods corresponding to FIG. 9 according to illustrative embodiments of the present disclosure.
FIG. 10B is a flow diagram of digital camera methods corresponding to FIG. 9 according to illustrative embodiments of the present disclosure.

FIG. 10A illustrates the operation of display 10. Display 10 receives a received image 40 in step 110 and displays received image 40 in step 120. The process then repeats. FIG. 10B illustrates the operation of digital camera 20. Digital camera 20 captures an image in step 190, compares it to a previously recorded image 42 in step 200 and, if the images are different (step 210), the image is recorded in step 150 and a new image is captured in step 190 (captured image 41). If the images are the same, the image is not recorded and a new image is captured in step 190. The process then repeats. This simple system can function so long as the digital camera frame rate is at least as great as or exceeds that of the display frame rate. For example, a camera frame rate that is twice the display frame rate can function well. In comparison, an optical communication system 99 relying on a display sync pixel 14 as a display pixel 12 must process the image to find and analyze the state of display sync pixel 14 whereas an optical communication system 98 relying on detecting changes in images must compare the images. A choice between optical communication systems 98, 99 can be made depending on available image processing hardware, respective display and camera frame rates, and relevant signal-to-noise ratios between the communication systems.

Figure 11:
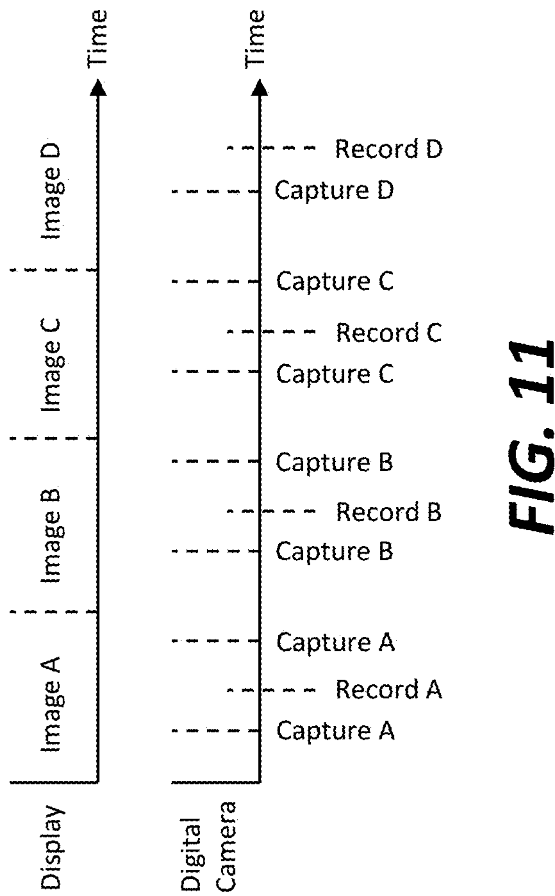
FIG. 11 is a timeline illustrating display and camera operations according to illustrative embodiments of the present disclosure.

FIG. 11 is a timeline illustrating operations according to embodiments of the present disclosure. As shown in FIG. 11, at an arbitrary time display 10 receives and displays an image A, then receives and displays an image B, and so on, at a regular display frame rate. At the same time, digital camera 20 captures image A shown on display 10 at an arbitrary time, compares the captured image 41 A to any pre-recorded image 42 (of which there is initially none), and finding a difference between the captured image 41 A and no pre-recorded image 42, records image 42 A. At a period corresponding to a camera frame rate faster than the display frame rate, digital camera 20 captures another image of display 10, compares the captured image 41 A to the prior recorded image 42, and finding that the compared images are the same, ignores the newly captured image 41 and captures image B. Image B is different from recorded image 42 A and is therefore stored. Digital camera 20 captures another image B of display 10, compares the captured image 41 B to the immediately prior recorded image 42 B, and finding that the compared images are the same, ignores the newly captured image 41 B. Digital camera 20 then captures image C, an image different from image B, so image C is then recorded. The process continues.

In some embodiments of the present disclosure and as shown in FIG. 12, light 30 emitted from display pixels 12 of display 10 can be captured by multiple digital cameras 20A, 20B, 20C (collectively digital cameras 20) each disposed within a direct line-of-sight of display 10 and recorded to provide recorded image 42 for each digital camera 20, respectively. As used herein, direct line-of-sight is a path through space traversed by a beam of light without redirection or obstruction. A direct-line-of sight can be a line through space (e.g., free space) traveled by a light ray, for example a visual axis or sightline, that is only curved due to gravity or atmospheric refraction.

Thus, in embodiments, an optical communication system 98 comprises a display comprising display pixels 12 operable to display an image on display 10 with display pixels 12 and digital cameras 20 (e.g., a plurality of digital cameras 20) disposed and operable to capture and record the image displayed on display 10 (e.g., received image 40). Each digital camera 20 can be in a direct line-of-sight from display 10.

In some embodiments, received image 40 displayed on display 10 captured by multiple digital cameras 20 provides a broadcast, e.g., communication from one to many such as one display 10 to many digital cameras 20. In some other embodiments, received image 40 displayed on display 10 can have an encoded address, e.g., in one or more address pixels 32 of display pixels 12 as shown in FIG. 13A, and each digital camera 20 can have a camera identifier (e.g., an ordered set of characters such as numbers and letters that identifies the digital camera 20). An encoded address can be a binary number represented by display pixels 12 that are address pixels 32 turned on or off to represent ones or zeros in the binary number. Alternatively, a binary number can be represented by a relative luminance of one or more address pixels 32. If the camera identifier matches the encoded address in an image 41 captured by digital camera 20, the digital camera 20 can record image 42 for subsequent decoding and communication. If not, captured image 41 is ignored. In some embodiments, the encoded address can be a broadcast address intended for all digital cameras 20 capturing image 41. In some embodiments, the encoded address can be a group address intended for a subset of digital cameras 20 capturing image 41. In some embodiments, the encoded address can be an individual address intended for one of digital cameras 20 capturing image 41. Thus, captured image 41 can be decoded sufficiently to detect and analyze the encoded address before recording image 42 for subsequent processing. If the encoded address is in a consistent location, and optionally a different color or has other distinguishing characteristics, the extraction of the encoded address can be relatively simple and require relatively little image processing, for example by image processor 50.

In some embodiments, a captured image 41 can comprise multiple information portions, each intended for a different digital camera 20. For example, display 10 can comprise rows and columns of pixels and the image comprises one or more encoded addresses in each row or as part of a two-dimensional array subset of display pixels 12, indicating that the information in the row (e.g., a one-dimensional image) is intended for the digital camera 20 having the corresponding camera identifier. In some embodiments, two or more display pixels 12 subsets of the image can comprise a same encoded address in each subset, e.g., each row.

In some embodiments, no encoded address is necessary if the receiving digital cameras 20 have a fixed assignment to a subset of each captured image 41, for example a row of captured image 41. The row can be assigned by the camera identifier or can be implicit. For example, a camera identifier of a digital camera 20 can correspond to a row of a captured image 41 (or some other predetermined subset of captured image 41). For example, digital camera 20 with camera identifier one can record row one of captured image 41, digital camera 20 with camera identifier two can record row two of captured image 41, and so on.

Figure 14B:
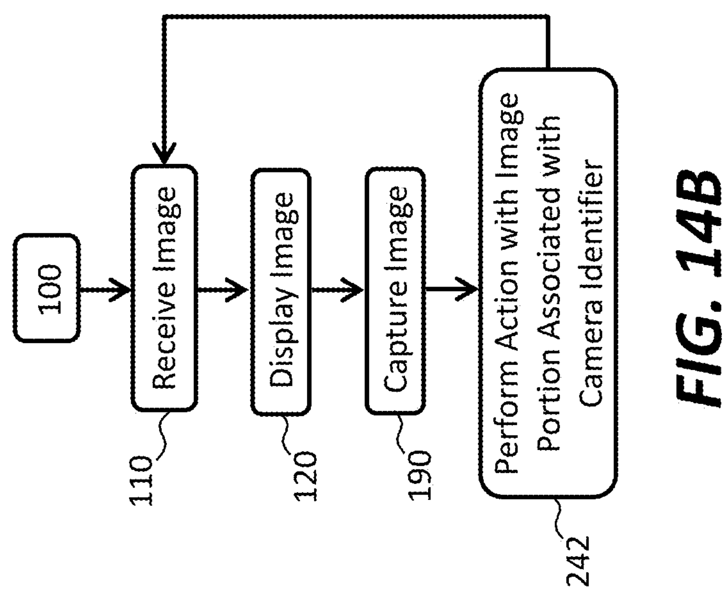
FIGS. 14A and 14B are flow diagrams of broadcast optical communication methods according to illustrative embodiments of the present disclosure.
Figure 14A:
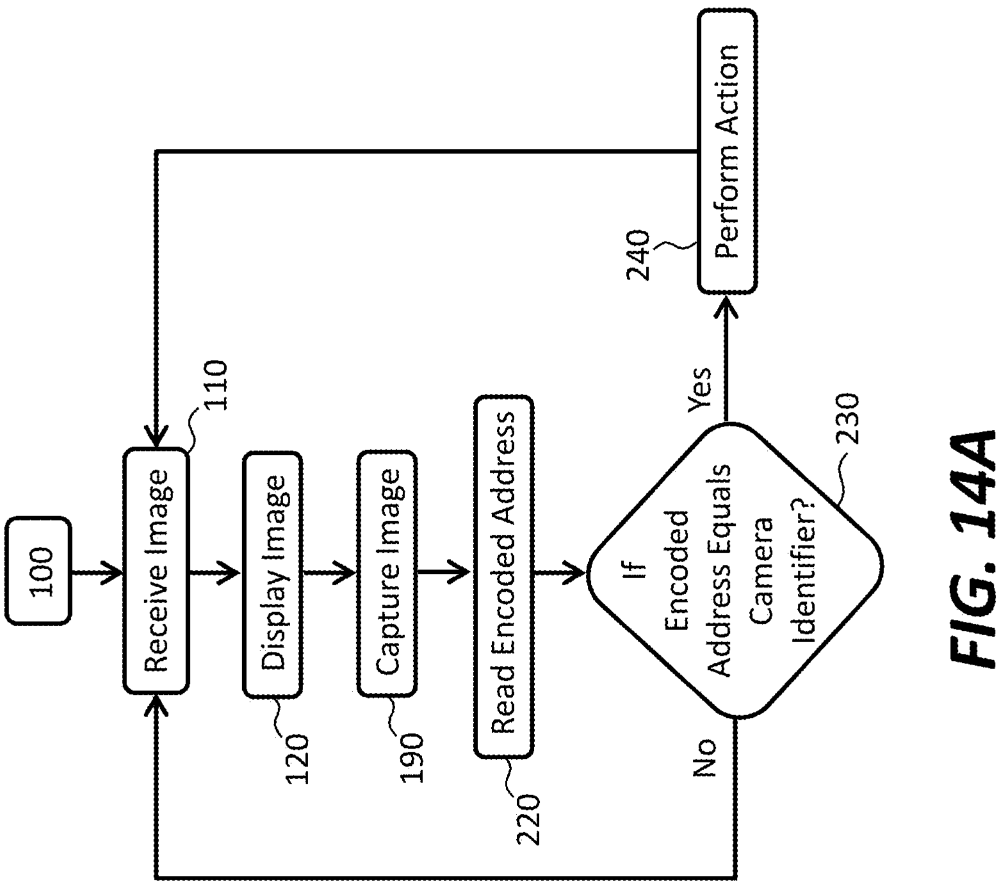

According to embodiments of the present disclosure and as illustrated in FIGS. 14A and 14B, a method of operating an optical communication system 98 provided in step 100 can comprise receiving and displaying an image with display pixels 12 in steps 110 and 120 and capturing the image with digital camera 20 in step 190. As shown in FIG. 14A, methods can comprise reading the encoded address(es) in captured image 41 in step 220. If the encoded address matches the camera identifier of a digital camera 20 (step 230), digital camera 20 (or a camera circuit 28 associated with digital camera 20) can perform an action in step 240, for example recording at least a portion of captured image 41 (e.g., all of the image, e.g., forming recorded image 42) with one or more (e.g., all of the) multiple digital cameras 20. In some embodiments, each of digital cameras 20 comprises a camera identifier and methods comprise providing an image with one or more addresses encoded in the image and identifying the one or more encoded addresses in the image with each digital camera 20. If the encoded address in the image matches the camera address of digital camera 20, digital camera 20 can perform an action in step 240, for example recording image 42. If the encoded address in the image does not match the camera address of digital camera 20, the action is not performed. New captured images 41 can be determined using methods described above, e.g., as illustrated and discussed with respect to FIGS. 1-11.

In some embodiments, a plurality of addresses are encoded in the image, each encoded address is associated with a portion of the image, and methods of the present disclosure comprise recording the portion associated with the encoded address with a digital camera 20 having a camera identifier matching the encoded address. For example, each row of the image can have an encoded address, e.g., as shown in FIG. 13B and digital camera 20 having a matching camera identifier can record the row. Alternatively, the image can have two-dimensional subsets, each with an encoded address.

In some embodiments and as illustrated in FIG. 14B, each of digital cameras 20 captures and records a portion of the image corresponding to a camera identifier associated with digital camera 20 in step 242. In such embodiments, the image portion is pre-allocated to digital camera 20 with a given camera identifier. For example, digital camera 20 with camera identifier one can capture and record row one of the image, digital camera 20 with camera identifier two can capture and record row two of the image, and so on. This approach is less flexible but does not require the overhead of any encoded addresses, so less image processing is needed and no display pixels 12 need be allocated to encoding addresses.

In some embodiments of the present disclosure and as shown in FIGS. 1 and 12, digital camera(s) 20 are in a direct line-of-sight from display 10 so that images (e.g., received images 40) displayed on display 10 can be directly imaged with digital camera 20. In other words, light 30 emitted from display pixels 12 of display 10 can impinge on camera pixels 22 after passing only through free space (e.g., only through a vacuum or atmosphere). In some other embodiments, light 30 emitted from display 10 is processed or controlled in some way before it impinges on digital camera 20. For example, and in some embodiments, digital camera 20 is not in a direct line-of-sight from display 10.

Figure 15:
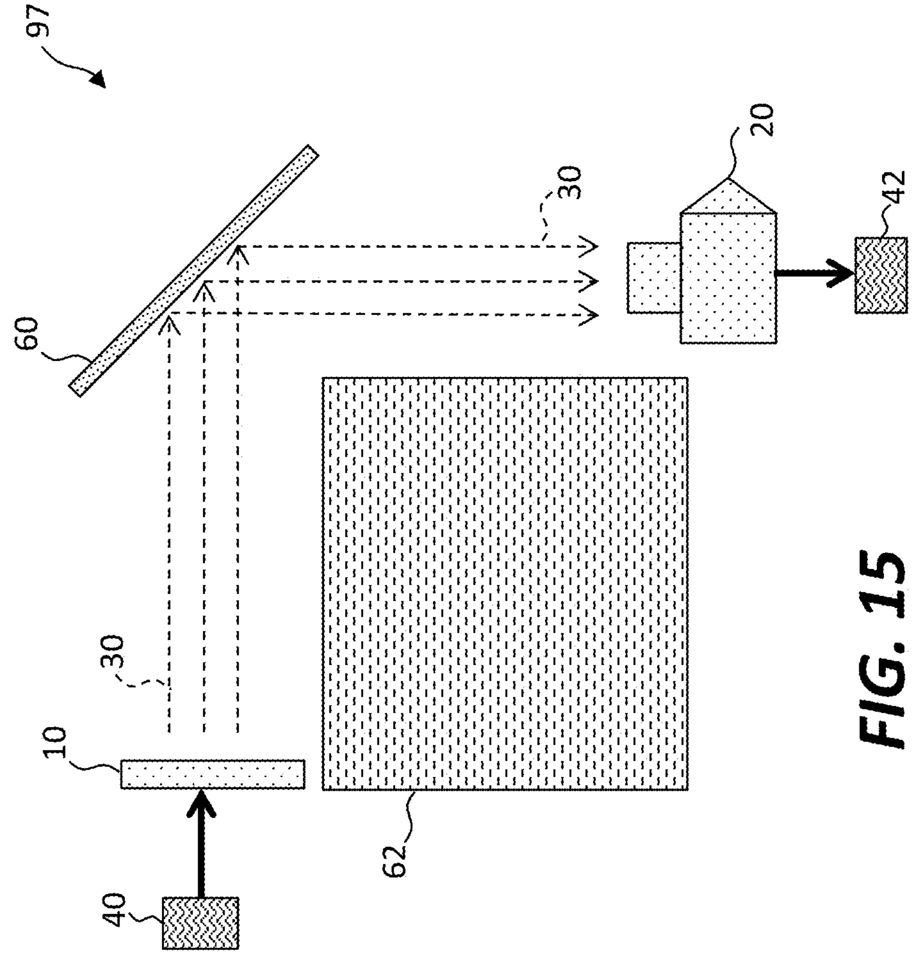
FIG. 15 is a schematic diagram of an optical communication system comprising a display, digital camera, and mirror according to illustrative embodiments of the present disclosure.

In such non-line-of-sight embodiments according to the present disclosure and as shown in FIG. 15, an optical communication system 97 comprises a display 10 comprising display pixels 12 operable to display an image on display 10 with display pixels 12 and a digital camera 20 operable to record the image on display 10, wherein display 10 and digital camera 20 are not in a direct line-of-sight. For example, a direct line-of-sight between display 10 and digital camera 20 can be obscured by an opaque blocking structure 62 that prevents the propagation or transmission of light 30 emitted from display 10 to digital camera 20 or otherwise interrupts an optical line-of-sight. As shown in FIG. 15 and according to embodiments of the present disclosure, optical communication system 97 can comprise a mirror 60 that reflects the image displayed on display 10, for example around blocking structure 62, and digital camera 20 can be disposed and operable to record the light 30 reflection of the image displayed on display 10. Mirror 60 can comprise a substantially flat glass sheet coated with a reflective material, for example comprising a metal such as silver or silver nitrate. Blocking structure 62 can be a cabinet in a room, e.g., a data center. Thus, optical systems with displays 10 and digital cameras 20 can be spatially arranged in a variety of ways and in a variety of different physical contexts, such as rooms with cabinetry arranged in various locations. In embodiments, light 30 is reflected from multiple mirrors 60 to propagate from display 10 to digital camera 20.

Figure 16:
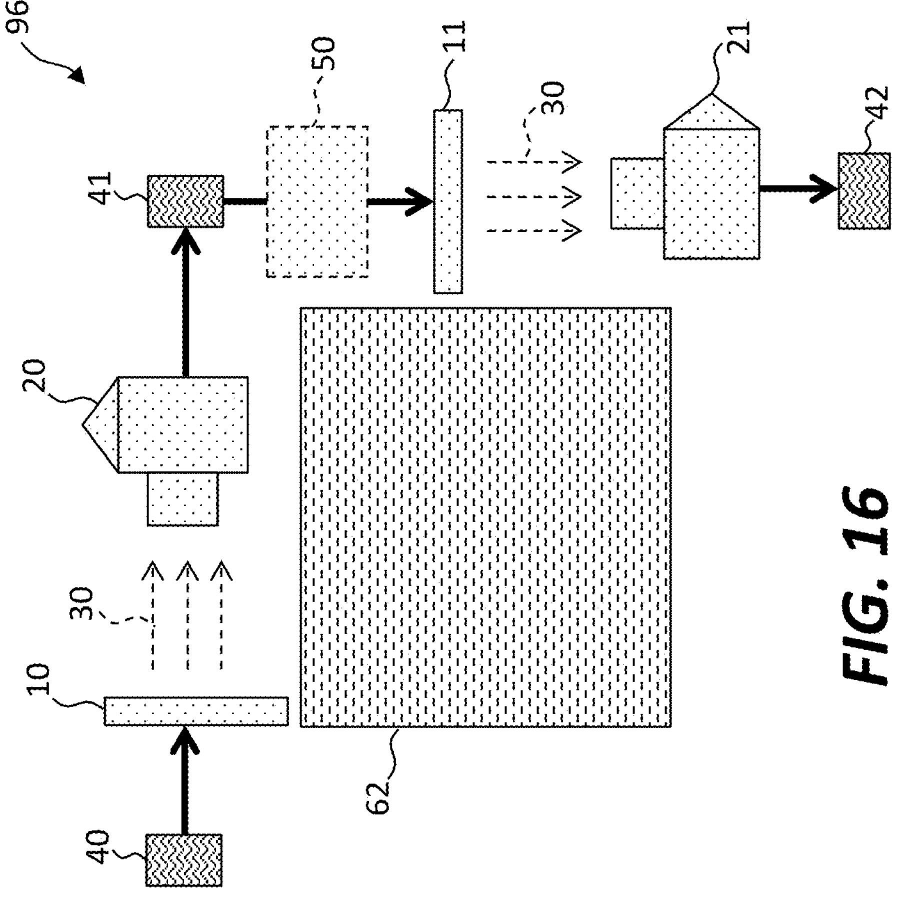
FIG. 16 is a schematic diagram of an optical communication system comprising a display, digital camera, and an intermediate digital camera and display according to illustrative embodiments of the present disclosure.

In some embodiments, received image 40 displayed on display 10 is replicated on a second display 11 rather than reflected. As shown in FIG. 16, an optical communication system 96 can comprise a first display 10 comprising first display pixels 12 operable to display a first image on first display 10 with the first display pixels 12, a first digital camera 20 disposed and operable to capture the first image on first display 10, a second display 11 having second display pixels 12 operable to display at least a portion of a version of first captured image 41 as a second image with the second display pixels 12, and a second digital camera 21 disposed and operable to capture and record the second image. First digital camera 20 can be spatially arranged within a line-of-sight of first display 10 and second digital camera 21 can be spatially arranged within a line-of-sight of second display 11, while first display 10 and second digital camera 21 are not within a line-of-sight, for example because of blocking structure 62. Thus, such embodiments enable received image 40 to be transmitted to a variety of different spatial locations and recorded, despite the presence of one or more blocking structures 62.

In operation, first display 10 receives image 40 and displays received image 40 to produce light 30 that propagates over a first line-of-sight to first digital camera 20. First digital camera 20 captures image 41. Captured image 41 is optionally processed with image processor 50 (for example to enlarge, increase the contrast of, or remove noise from captured image 41) and displayed on second display 11, for example using a display circuit 18. Light 30 from second display 11 propagates over a second line-of-sight different from the first line-of-sight to second digital camera 21 where it is captured and recorded as recorded image 42. Thus, information can be transmitted from display 10 to second digital camera 21 using intermediate digital camera 20 and intermediate second display 11, despite the presence of a blocking structure 62.

Figure 17:
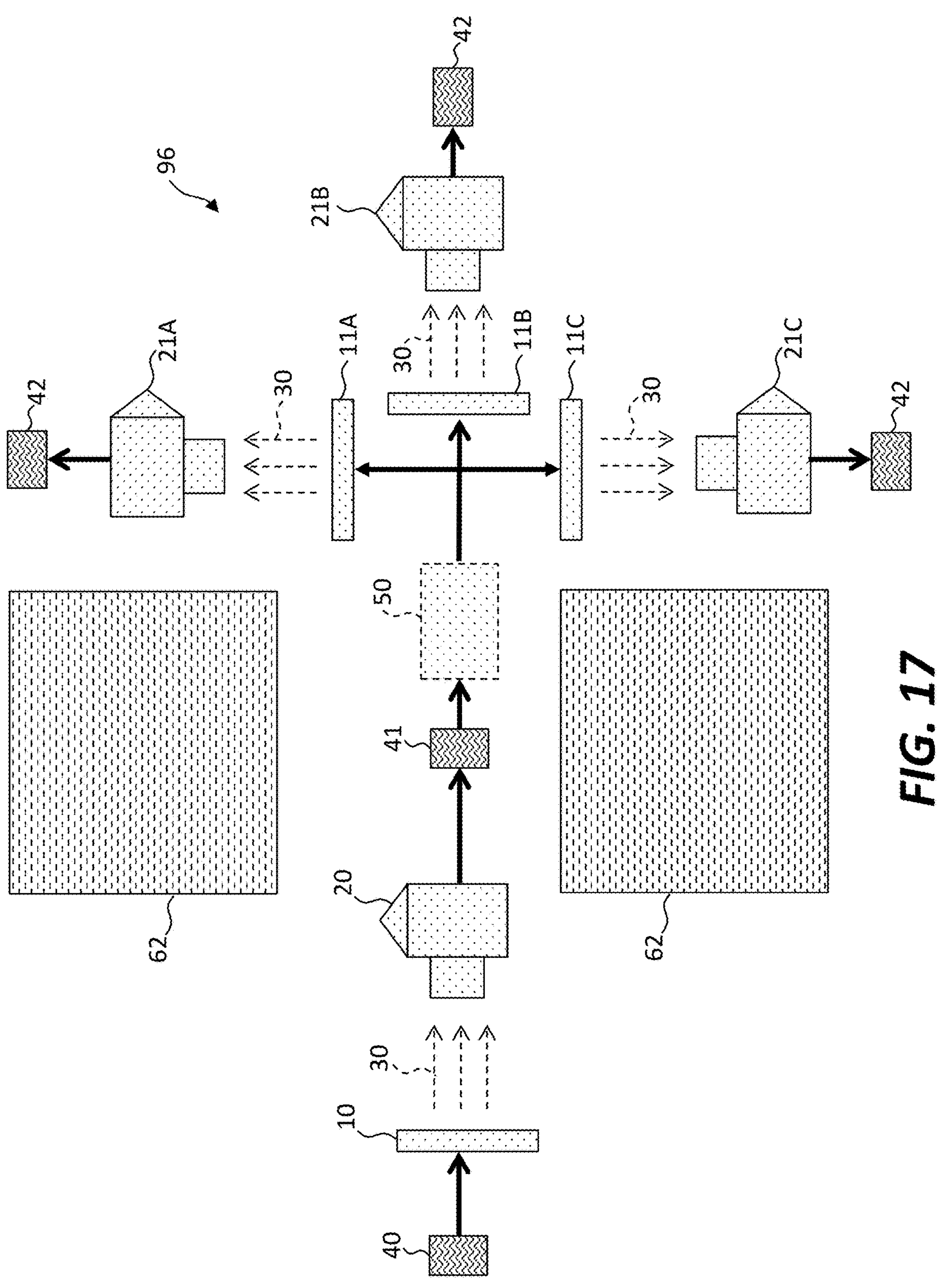
FIG. 17 is a schematic diagram of an optical communication system comprising a display, digital camera, and multiple intermediate digital cameras and displays according to illustrative embodiments of the present disclosure.

In further embodiments and as shown in FIG. 17, captured image 41 of first digital camera 20 can be displayed (optionally after processing with image processor 50) on multiple second displays 11 for multiple different lines-of-sight and to transmit image data to multiple different locations having multiple different second digital cameras 21. FIG. 17 illustrates embodiments in which captured image 41 is displayed on second displays 11A, 11B, 11C to emit light 30 to second digital cameras 21A, 21B, 21C (collectively second digital cameras 21), respectively, where light 30 is captured, optionally analyzed, and recorded as recorded image 42. Thus, such embodiments enable received image 40 to be transmitted to a variety of different spatial locations and recorded, despite the presence of line-of-sight blocking structures 62. The received images 40 transmitted to the multiple second digital cameras 21 can comprise addresses encoded in address pixels 32 and the multiple second digital cameras 21 can comprise camera identifiers, as described with respect to FIGS. 12-14A.

In some embodiments, digital camera 20 and second displays 11 (e.g., 11A, 11B, 11C) comprise an optical image broadcasting system for the image displayed on display 10 (e.g., first display 10). Thus, an optical communication system 96 can comprise a digital camera 20 operable to capture an image (e.g., received image 40) displayed on first display 10 and second displays 11. Each of second displays 11 can comprise display pixels 12 operable to display the image on second display 11 with display pixels 12. Second displays 11 can be directly controlled by digital camera 20 or by a camera circuit 28 directly controlled by digital camera 20 or controlling digital camera 20 and controlling second displays 11. Optical communication systems 96 of the present disclosure can be distinguished, for example from a conventional video broadcast system by capturing an image shown on a display 10 (rather than a real-world scene) and directly controlling second displays 11 with the digital camera 20 or a common circuit controlling or connected to both digital camera 20 and second displays 11 (e.g., camera circuit 28). Some embodiments comprise only a single second display 11 under control of digital camera 20, camera circuit 28, or under common control with digital camera 20 (e.g., camera circuit 28).

In embodiments of the present disclosure, displays 10 can have faults or can fail, for example after use. Such failures can present as display pixels 12 that are stuck-on, stuck-off or cannot display pixels at a desired brightness or rate. These failures can be detected by camera circuits 28 connected to, or a part of, digital cameras 20. For example, according to some embodiments, camera circuit 28 can track average luminance over time of display pixels 12 in a display 10 and, if the tracked luminance changes from a desired average, display 10 can be replaced or some portions of display pixels 12 retired from use to display images.

Figure 18:
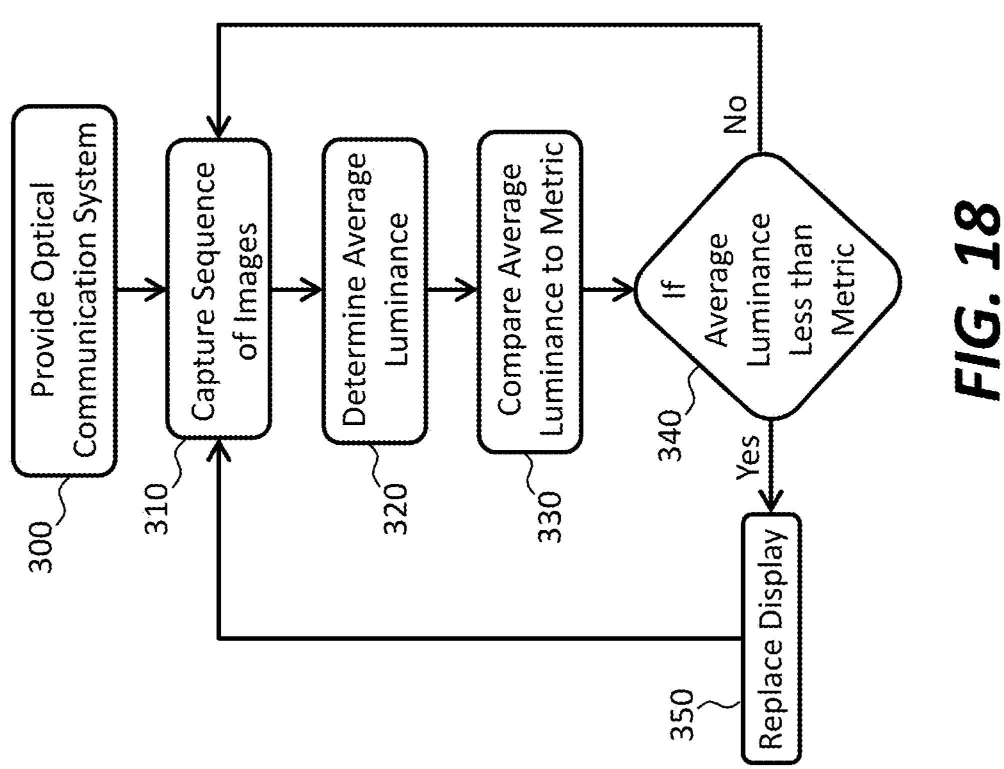
FIG. 18 is a flow diagram of testing an optical communication system using average display luminance according to illustrative embodiments of the present disclosure.

Thus, according to embodiments of the present disclosure and as illustrated in FIG. 18, a method of testing an optical communication system 95, 96, 97, 98, 99 can comprise providing optical communication system 95, 96, 97, 98, 99 (e.g., display 10 and digital camera 20, digital camera 20 operable to capture images 41 shown on display 10 as received images 40) in step 300, capturing a sequence of images shown on display 10 in step 310, determining an average luminance of display 10 or of display pixels 12 in display 10 in step 320, for example by averaging light 30 emitted by display pixels 12 or display 10 over the sequence of images shown on display 10, comparing the average luminance of display 10 or display pixels 12 to a predetermined luminance in step 330, and if the average and pre-determined luminances are different by a pre-determined amount (e.g., by a predetermined metric) in step 340, replacing display 10 in step 350 or if not, capturing another sequence of images in step 310, for example after a period of time or after a number of images are display on display 10.

In some other embodiments, display pixels 12 can be exercised periodically, for example each time a trillion images are displayed. The exercise can comprise displaying a test pattern on the display, for example turning on all display pixels 12 to a desired maximum luminance or turning off all display pixels 12 to a desired minimum luminance, or both, for example using display circuit 18. An image corresponding to each of the test images can be captured and analyzed to determine any defective display pixels 12, according to a pre-determined metric, such as maximum and minimum desired luminances, for example using camera circuit 28. If any defective display pixels 12 are found, the results can be reported to an external system or authority and appropriate action taken, for example replacing the display 10 with the defective display pixels 12.

Figure 19:
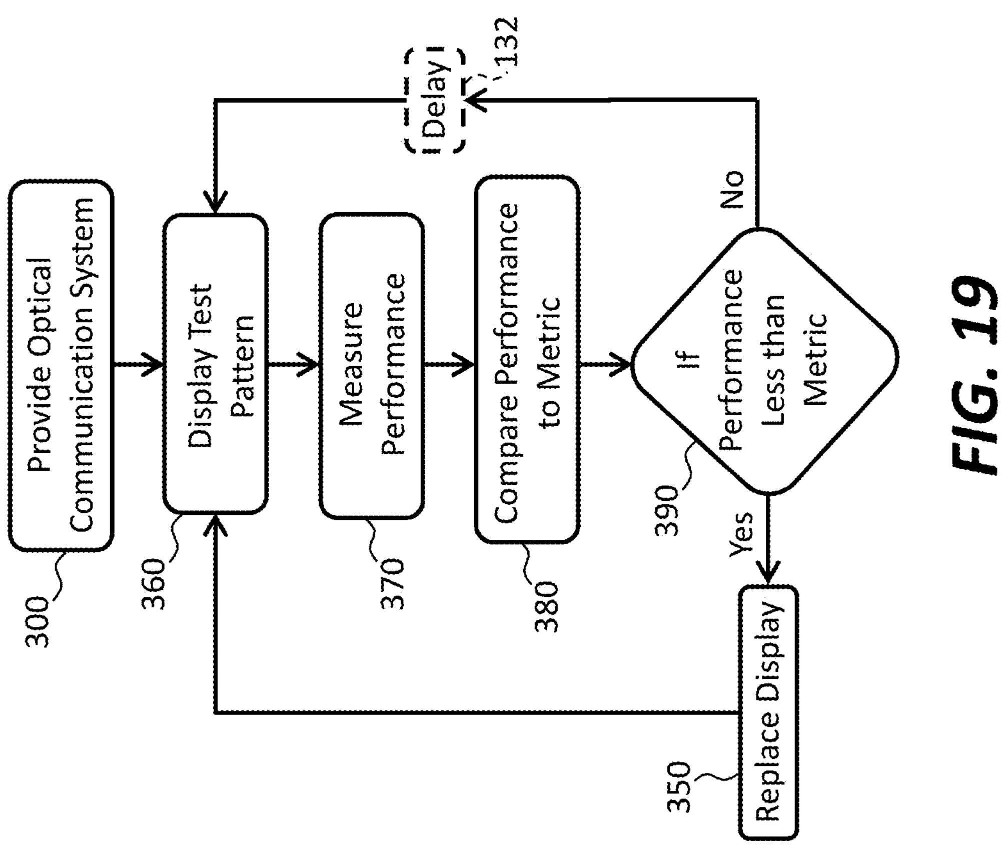
FIG. 19 is a flow diagram of testing an optical communication system using test patterns according to illustrative embodiments of the present disclosure.

Thus, according to embodiments of the present disclosure and as illustrated in FIG. 19, a method of testing an optical communication system 95, 96, 97, 98, 99 can comprise providing optical communication system 95, 96, 97, 98, 99 (e.g., display 10 and digital camera 20, digital camera 20 operable to capture images 41 shown on display 10) in step 300, displaying a test pattern on display 10 in step 360, measuring a performance of display 10 or display pixels 12 in display 10 in step 370, for example by capturing an image of display 10, comparing captured image 41 of display 10 or display pixels 12 to a predetermined metric in step 380, and if the performance is less than a predetermined metric in step 390, replacing the display in step 350 or if not, displaying a same or different test pattern of one or more images in step 360, for example after a period of time or after a number of images are display on display 10 (optional delay step 132).

According to embodiments of the present disclosure, a display 10 can display an image (e.g., received image 40) carrying information that is captured by a digital camera 20 (e.g., captured image 41) and optionally analyzed (e.g., by image processor 50) to determine if captured image 41 is intended for digital camera 20 (and an associated processing or communication system). If captured image 41 is determined to be intended for digital camera 20, captured image 41 can be recorded as a recorded image 42 for further processing, e.g., decoding or decryption for the associated processing or communication system by an image processor 50. Recorded image 42 can have more pixels than the displayed image but, in embodiments, recorded image 42 has the same number or fewer pixels than displayed received image 40. The number of recorded pixels in recorded image 42 can depend on the display number and size of display pixels 12 in display 10, the camera number and size of camera pixels 22 in digital camera 20, the optical system imaging display 10 onto digital camera 20, and the distance from display 10 to digital camera 20. Thus, embodiments of the present disclosure provide an optical communication system 95, 96, 97, 98, 99, e.g., a free-space optical communication system 95, 96, 97, 98, 99 that optically transmits information from display 10 to digital camera 20. Since information from a single display 10 can be transmitted to different digital cameras 20 at different distances, the resolution of captured image 41 and recorded image 42 can likewise differ.

Figure 20:
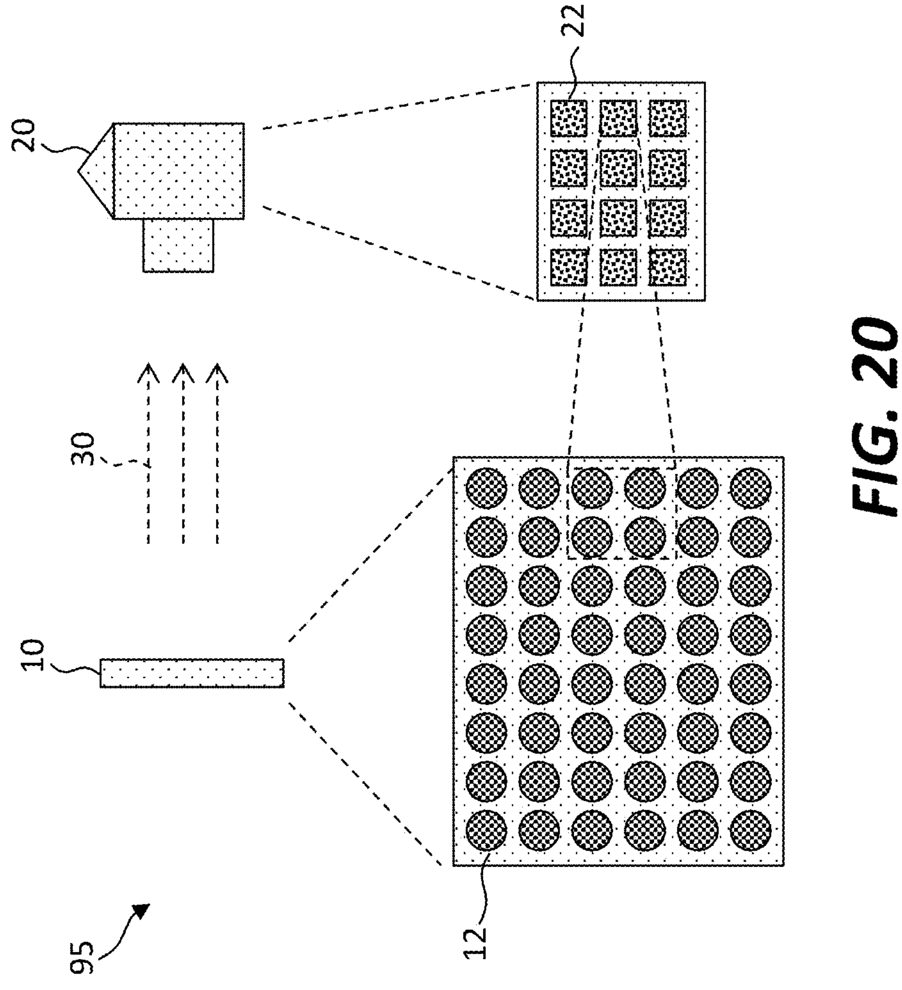
FIG. 20 is a schematic diagram of an optical communication system with more display pixels than camera pixels according to illustrative embodiments of the present disclosure.

According to some embodiments of the present disclosure and as shown in FIG. 20, a variable-resolution optical communication system 95 comprises a display 10 operable to display an image (e.g., received image 40) with a display number of display pixels 12 and a digital camera 20 disposed and operable to capture a camera image (e.g., captured image 41) with a camera number of camera pixels 22 and to record captured image 41 with a recorded number of recorded pixels as recorded image 42. As shown in FIG. 1 and in some embodiments, the camera number of camera pixels 22 is greater than the display number of display pixels 12. The greater number of camera pixels 22 enables digital camera 20 (or camera circuit 28) to improve the signal-to-noise ratio of a recorded image 42 by combining multiple camera pixel 22 values (for example corresponding to a single display pixel 12 value) into a single recorded pixel value.

However, in some embodiments, for example if digital camera 20 needs to operate at a camera frame rate that is greater than can be achieved with a larger number of camera pixels 22, digital camera 20 can comprise a smaller number of camera pixels 22 (e.g., smaller than a number of display pixels 12 showing received images 40 that are captured by digital camera 20) to increase the achievable camera frame rate. As shown in FIG. 20 and in some embodiments, the camera number of camera pixels 22 is less than the display number of display pixels 12. In some embodiments, a recorded number of pixels in a recorded image 42 (e.g., recorded by digital camera 20 or camera circuit 28) can be less than the display number.

In some embodiments where, for efficiency or resolution reasons, display 10 displays binary values on display pixels 12 (e.g., off and on luminance corresponding to binary values zero and one, or vice versa) and the camera number is effectively smaller (although not necessarily absolutely smaller because of the distance between digital camera 20 and display 10 and resolution limits on the optics used to image onto camera pixels 22 of digital camera 20) than the display number, additional information can be optically transmitted from display 10 to digital camera 20 by imaging multiple display pixels 12 onto fewer camera pixels 22, for example onto a single camera pixel 22, as shown in FIG. 20. In some embodiments, the camera number is not less than the display number, but the number of effectively distinguished pixels in captured image 41 is less than the display number, so that multiple camera pixels 22 effectively image a same display pixel 12 and captured image 41 has fewer distinct pixels than display pixels 12 in display 10.

FIG. 20 illustrates an embodiment with a two-by-two array of display pixels 12 imaged onto a single camera pixel 22. However, embodiments of the present disclosure are not limited to this embodiment. For example, two display pixels 12 (e.g., adjacent display pixels 12) can be imaged onto single camera pixel 22, in either a vertical or horizontal arrangement. In some embodiments, three, four, five, or more (e.g., adjacent) display pixels 12 can be imaged onto single camera pixel 22, in either a vertical or horizontal arrangement. In some embodiments, a two-dimensional array of display pixels 12 (as shown in FIG. 20) is imaged onto a single camera pixel 22. FIG. 20 illustrates a two-by-two array imaged onto a single camera pixel 22 but embodiments of the present disclosure are not so limited. For example, a three-by-three, four-by-four, five-by-five, six-by-six, and so on, array of display pixels 12 (e.g., adjacent display pixels 12) can be imaged onto a single camera pixel 22, so that a ratio between the number of display pixels 12 in the subset is a square, for example four, nine, sixteen, twenty-five, thirty-six, forty-nine, or sixty four, or any value equal to $x^2$ where x is an integer no less than two. Square subsets of display pixels 12 can be easier to optically image onto a single camera pixel 22. Adjacent pixels are pixels between which there are no other non-adjacent pixels.

The array of display pixels 12 can be binary display pixels 12 and a single (or effectively single) camera pixel 22 can therefore receive multiple different binary optical signals that are received from display 10 and combined by the single camera pixel 22. Thus, the single camera pixel 22 can capture multiple values corresponding to various combinations of binary display pixels 12 imaged onto the single camera pixel 22. As shown in FIGS. 21A-21E, any one of display pixels 12 in the subset array of display pixels 12 can be on or off and the total luminance of the subset of display pixels 12 is captured by the single camera pixel 22. Because the effectively single camera pixel 22 cannot distinguish the different display pixels 12 in the subset (e.g., the square or rectangle of display pixels 12), light 30 emitted by the different display pixels 12 in the subset cannot be distinguished so that the single camera pixel 22 simply captures a luminance equal to the sum of light 30 output by the subset of display pixels 12. This sum can be a value from zero (all display pixels 12 in the subset turned off) to a value equal to the number display pixels 12 in the subset (all display pixels 12 in the subset turned on). Thus, for a subset of N display pixels 12, the number of values captured by the single camera pixel 22 is equal to N+1. The number of display pixels 12 imaged onto the single camera pixel 22 can be an integer and the corresponding number of values the single camera pixel 22 can provide is accordingly the integer plus one.

Figures 21A, 21B, 21C, 21D, 21E:
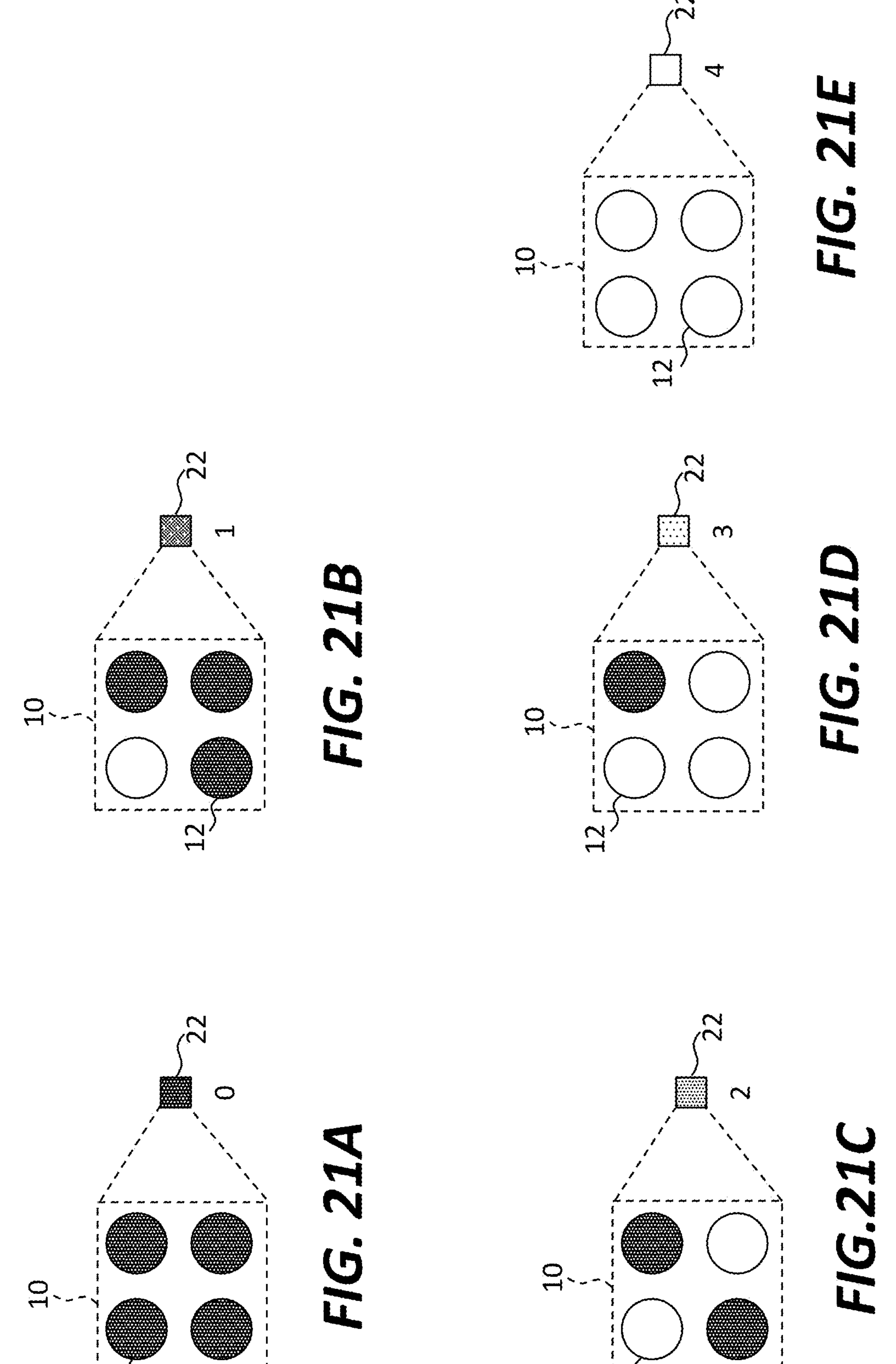
FIGS. 21A-21E are schematic diagrams of values transmitted from pixel subsets of a binary display according to illustrative embodiments of the present disclosure.

For the example of FIGS. 21A-21E for four (N) display pixels 12 in the subset, the number of possible values is five (e.g., zero, one, two, three, four, and five, as illustrated in FIGS. 21E to 21A, respectively). A value of zero can only be optically transmitted with all display pixels 12 in the subset turned off and the maximum value can only be transmitted with all display pixels 12 in the subset turned on. However, values between these extremes can be optically transmitted in different ways. For example, a value of one can be optically transmitted with any one of display pixels 12 turned on and the rest turned off. In FIG. 21D, the four display pixels 12 have four different ways to optically transmit a one value, as is also the case for a value of three (e.g., N−1) as in FIG. 21B. FIG. 21C illustrates one of six different ways to transmit a value of two with four display pixels 12. Each value optically transmitted can be the number of possible combinations of the number of turned-on display pixels 12 that can be made from the total number of display pixels 12 in the subset of display pixels 12 imaged onto the single camera pixel 22. Thus, in some embodiments, camera pixels 22 can specify a number of different values substantially equal to a ratio between the display number and the camera number plus one. This technique can be used to increase the amount of information optically transmitted from a display 10 with binary display pixels 12 to a digital camera 20 with fewer effective camera pixels 22 (a smaller effective resolution), increasing the data rate of the optical communication system 95. Binary display pixels 12 can be more efficient than display pixels 12 that emit different gray-scale values, for example with different currents. In some embodiments, the display number is an integer multiple of the camera number in one or two dimensions, is a factor of a power of two greater than zero or is an integer multiple that is a square (e.g., $x^2$). Each of these multiples can image the multiple number of display pixels 12 onto a camera pixel 22 depending on the relative resolution of display 10 and digital camera 20 and the imaging optics exposing an image on display 10 onto digital camera 20.

In some embodiments of the present disclosure, for example where the camera number of camera pixels 22 in digital camera 20 is equal to or larger than the display number of display pixels 12 in display 10, digital camera 20 can be a binary digital camera 20 that only records binary values. Such a binary digital camera 20 can have simpler circuitry and faster camera frame rates enabling the use of simpler, less complex, and expensive digital cameras 20 with greater resolution and optical communication systems 95, 96, 97, 98, 99 with increased bandwidth and data rates. Simplified, less sensitive, and faster sense circuits can be used in camera pixels 22 in such a binary digital camera 20. More broadly, camera pixels 22 in digital camera 20 can have a reduced number of possible values to which camera pixels 22 can respond, take on, or have, for example equal to the number of display pixels 12 in a subset of display pixels 12 imaged on each camera pixel 22 of digital camera 20 plus one (for zero light 30 emitted). In the extreme case, each camera pixel 22 substantially captures light 30 from a single display pixel 12 and the number of possible different values is two (e.g., zero and one for a binary camera pixel 22).

Figure 22:
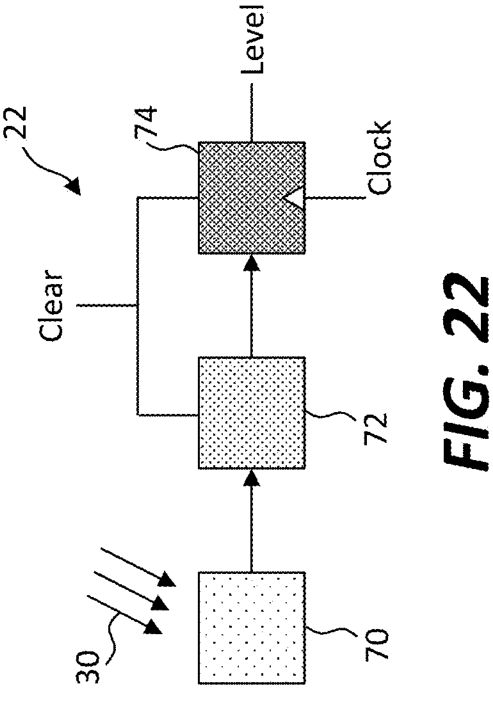
FIG. 22 is a schematic diagram of a binary camera pixel according to illustrative embodiments of the present disclosure.

For example, and as illustrated in FIG. 22, in embodiments of the present disclosure, each binary camera pixel 22 in a binary digital camera 20 comprises a light converter 70 (a light sensor 70), a charge accumulator 72, and a bi-stable bit-storage device 74. Light converter 70 (e.g., a photodiode, pinned photodiode, phototransistor, charge-coupled device (CCD), or CMOS sensor) is responsive to incident light 30 to provide electronic charge (electrons) accumulated in charge accumulator 72 (e.g., a charge-storage device such as a capacitor found in a CCD or a CMOS imager) and, when the accumulated charge exceeds a pre-determined threshold, triggers bi-stable bit-storage device 74 (e.g., a flip-flop or electronic latch), to change a state of bi-stable bit-storage device 74 and whose value can be read by read-out circuits (e.g., a binary shift register) in the binary digital camera 20. The accumulation period (e.g., for a frame period) can be controlled by a clock signal. In some embodiments, the amount of charge needed to trigger a state change in bi-stable bit-storage device 74 can be variable, for example externally controlled with an analog voltage signal, with a level or sensitivity signal. In embodiments, binary digital camera 20 only stores binary image values (e.g., can be a black-and-white camera storing one bit for each image pixel and is not a gray-scale camera storing multiple bits per pixel, such as an eight-bit value per pixel).

In some embodiments, the charge in charge accumulator 72 and the state of bi-stable bit-storage device 74 can be cleared with a clear signal provided externally to camera pixel 22, for example by grounding the charge accumulator 72 with a transistor connecting charge accumulator 72 to ground or resetting bi-stable bit-storage device 74 to a known (e.g., zero) state. Binary camera pixels 22 can be constructed using integrated-circuit materials, methods, and manufacturing tools, for example using silicon wafers and CMOS-compatible circuits.

In some embodiments of the present disclosure, an optical communication system 95, 96, 97 98, or 99 comprises a display 10 (e.g., a binary display 10) and a binary digital camera 20, 20A, 20B, 20C disposed relative to display 10 such that the binary digital camera 20 is operable to record a received image 40 displayed on display 10. Thus, optical communication system 95, 96, 97 98, or 99 can be a binary system, e.g., a wholly or exclusively binary system. Optical communication systems 95, 96, 97, 98, 99 according to embodiments of the present disclosure can be constructed using printed-circuit board and integrated circuit technologies.

Having described certain implementations of embodiments, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific elements, or where processes and methods are described as having, including, or comprising specific steps, it is contemplated that, additionally, there are apparatus and systems of the disclosed technology that consist essentially of, or consist of, the recited elements, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular reference to certain embodiments thereof, but it will be understood that variations and modifications can be effected within the spirit and scope of the disclosure.

PARTS LIST

10 display/first display/digital display
11, 11A, 11B, 11C second display
12 display pixel
14 display sync pixel
16 display sync detector
18 display circuit
19 display system
20, 20A, 20B, 20C digital camera/first digital camera/camera
21, 21A, 21B, 21C second digital camera
22 camera pixel
24 camera sync light emitter
26 camera sync detector
28 camera circuit
29 camera system
30 light
32 address pixel
40 received image/displayed image
41 captured image
42 recorded image
50 image processor
60 mirror
62 blocking structure
70 light converter/light sensor
72 charge accumulator
74 bi-stable bit-storage device
95 optical communication system
96 optical communication system
97 optical communication system
98 optical communication system
99 optical communication system
100 provide optical communication system step
110 receive image step
111 receive image with display sync pixel On step
112 receive image with display sync pixel Off step
120 display image step
130 turn display sync pixel on step
132 delay step
140 detect display sync pixel On state step
141 detect display sync pixel change state step
142 detect display sync pixel Off state step
150 camera record image step
160 turn display sync pixel off step/operate display sync pixel step 170 turn camera sync pixel On step
172 change camera sync pixel state step
175 turn camera sync pixel Off step
180 detect camera sync pixel state step
183 detect camera sync pixel change state step
185 check camera sync pixel On step
190 capture image step
192 analyze image step
194 detect display sync pixel step
196 determine display sync pixel state step
198 detect state step/detect state change step
200 compare image step
210 image different step
220 read encoded address step
230 encoded address matches camera identifier step
240 perform action step
242 perform action with image portion associated with camera identifier step
300 provide optical communication system step
310 capture sequence of images step
320 determine average luminance step
330 compare average luminance to metric step
340 if average luminance less than metric step
350 replace display step
360 display test pattern step
370 measure performance step
380 compare performance to metric step
390 if performance less than metric step

What is claimed is:

1. An optical communication system, comprising:

a display comprising a plurality of display pixels operable to display a plurality of images on the display, wherein the plurality of images comprises a first image and a second image;

a display synchronization signal device configured to emit light, wherein the display synchronization signal device is operable between at least a first state and a second state;

a digital camera disposed relative to the display such that the digital camera is operable to successively capture captured images of at least a portion of the display;

a camera synchronization detector configured to detect the light from the display synchronization signal device; and one or more circuits configured to:

control the display pixels to display the first image at a first time and to display the second image at a second time subsequent to the first time, control the display synchronization signal device to be in the first state when the first image is displayed by the display and to change to the second state when the second image is displayed by the display, control the camera synchronization detector to determine when the display synchronization signal device changes from the first state to the second state, and record one of the captured images of at least a portion of the second image in response to determining that the display synchronization signal device changed from the first state to the second state.

2. The optical communication system of claim 1, wherein either: (1) the first state comprises the display synchronization signal device being off and the second state comprises the display synchronization signal device being on; or (2) the first state comprises the display synchronization signal device being on and the second state comprises the display synchronization signal device being off.

3. The optical communication system of claim 1, wherein the display synchronization signal device comprises one or more of the plurality of display pixels on the display.

4. The optical communication system of claim 3, wherein the display pixels are disposed in a two-dimensional array and the one or more display pixels of the display synchronization signal device are in the two-dimensional array.

5. The optical communication system of claim 3, wherein the display pixels are matrix controlled and the one or more display pixels of the display synchronization signal device are updated after others of the display pixels are updated or are updated last in an image frame.

6. The optical communication system of claim 3, wherein the display pixels that display the plurality of images are disposed in a regular array and the one or more display pixels of the display synchronization signal device are spatially disposed separately from the regular array.

7. The optical communication system of claim 3, wherein the display pixels are disposed in a one-dimensional array and the one or more display pixels of the display synchronization signal device are in the one-dimensional array.

8. The optical communication system of claim 3, wherein the display pixels are disposed in a two-dimensional array comprising multiple one-dimensional arrays and each of the one-dimensional arrays comprises a corresponding display synchronization signal device comprising one or more of the plurality of display pixels in that one-dimensional array.

9. The optical communication system of claim 1, wherein the display synchronization signal device is separate from or adjacent to the display.

10. The optical communication system of claim 1, wherein the display synchronization signal device is operable to be separately controlled from at least a portion of the plurality of display pixels.

11. The optical communication system of claim 1, wherein the one or more circuits are configured to change the display synchronization signal device from the first state to the second state at the same time as or after the display changes from displaying the first image to displaying the second image.

12. The optical communication system of claim 1, wherein the digital camera comprises a plurality of camera pixels disposed in an array operable to successively capture the captured images.

13. The optical communication system of claim 12, wherein the camera synchronization detector comprises one or more of the plurality of camera pixels.

14. The optical communication system of claim 12, wherein the camera synchronization detector is separate from the digital camera.

15. The optical communication system of claim 1, further comprising a camera synchronization signal device configured to emit light, wherein the one or more circuits are configured to operate the camera synchronization signal device to emit signal light when the one of the captured images is recorded.

16. The optical communication system of claim 15, further comprising a display synchronization detector operable to detect the signal light emitted by the camera synchronization signal device.

17. The optical communication system of claim 1, wherein the plurality of images for the display further comprises a third image and the one or more circuits are further configured to:

control the display pixels to display the third image at a third time that is subsequent to the second time, control the display synchronization signal device to switch from the second state back to the first state when the third image is displayed by the display, control the camera synchronization detector to determine when the display synchronization signal device changes from the second state back to the first state, and record one of the captured images of at least a portion of the third image in response to determining that the display synchronization signal device changed from the second state back to the first state.

18. An optical communication system, comprising:

a display system comprising:

a display comprising a plurality of display pixels;

a display synchronization signal device configured to emit light, wherein the display synchronization signal device is operable between at least a first state and a second state; and a display circuit configured to:

receive data for a plurality of images, wherein the plurality of images comprises a first image and a second image, control the display to successively display the first image and then the second image with the display pixels, and control the display synchronization signal device to be in the first state when the first image is displayed by the display and to be in the second state when the second image is displayed by the display; and a camera system comprising:

a digital camera disposed relative to the display such that the digital camera is operable to successively capture captured images of at least a portion of the display;

a camera synchronization detector configured to detect the light from the display synchronization signal device; and a camera circuit configured to:

control the camera synchronization detector to determine when the display synchronization signal device changes from the first state to the second state, and store or process one of the captured images in response to determining that the display synchronization signal device changed from the first state to the second state and, optionally, to control a camera synchronization signal device to emit signal light in response to storing or processing the one of the captured images.

19. The optical communication system of claim 18, wherein either:

the display synchronization signal device comprises one or more of the plurality of display pixels on the display, or the display synchronization signal device is separate from or adjacent to the display.

20. The optical communication system of claim 18, wherein either:

the digital camera comprises a plurality of camera pixels disposed in an array and the camera synchronization detector is one or more of the plurality of camera pixels, or the camera synchronization detector is separate from the digital camera.

* * * * *